(12) United States Patent
Alexander et al.

(10) Patent No.: US 12,486,096 B1
(45) Date of Patent: *Dec. 2, 2025

(54) REUSABLE PORTABLE SHIPPING CONTAINER

(71) Applicant: Ember LifeSciences, Inc., Westlake Village, CA (US)

(72) Inventors: Clayton Alexander, Westlake Village, CA (US); Damian Lee, Westlake Village, CA (US); Robert James Speck, Westlake Village, CA (US); Kevin Michael Malak, San Diego, CA (US); Simon David James, Simi Valley, CA (US); Christopher Thomas Wakeham, Solana Beach, CA (US); Gregory Joseph Yang, San Diego, CA (US)

(73) Assignee: Ember LifeSciences, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/238,149

(22) Filed: Jun. 13, 2025

Related U.S. Application Data

(63) Continuation of application No. 19/074,173, filed on Mar. 7, 2025, now Pat. No. 12,358,710, which is a
(Continued)

(51) Int. Cl.
*B65D 81/38* (2006.01)
*B65D 25/20* (2006.01)

(52) U.S. Cl.
CPC ....... *B65D 81/3818* (2013.01); *B65D 25/205* (2013.01); *B65D 2203/10* (2013.01)

(58) Field of Classification Search
CPC .............. B65D 81/3818; B65D 25/205; B65D 2203/10
See application file for complete search history.

(56) References Cited

U.S. PATENT DOCUMENTS

| 5,174,122 A | 12/1992 | Levine |
| 7,253,731 B2 | 8/2007 | Joao |
| (Continued) |

FOREIGN PATENT DOCUMENTS

| CN | 101317048 A | 12/2008 |
| CN | 102538037 A | 7/2012 |
| (Continued) |

OTHER PUBLICATIONS https://livingpackets.com/the-box, available prior to Jul. 15, 2024; printed on Aug. 30, 2024.
(Continued)

*Primary Examiner* — Emmanuel E Duke
(74) *Attorney, Agent, or Firm* — Knobbe, Martens, Olson & Bear LLP

(57) ABSTRACT

A reusable shipper container has a container body with a payload chamber for holding goods and a lid operable to access the payload chamber. The reusable shipper container also has one or more sensors in the payload chamber to sense humidity or temperature of the payload chamber or the goods. The reusable shipper container also has a tablet display screen detachably coupled to the container body that communicates with the sensors in the payload chamber.

20 Claims, 16 Drawing Sheets

Related U.S. Application Data continuation of application No. 18/773,267, filed on Jul. 15, 2024, now Pat. No. 12,252,325.

(56) References Cited

U.S. PATENT DOCUMENTS

| | | | |
|---|---|---|---|
| 7,714,708 B2 | 5/2010 | Brackmann et al. | |
| 9,424,548 B1 | 8/2016 | Siegel et al. | |
| 10,010,213 B2 | 7/2018 | Alexander et al. | |
| 10,131,478 B2 | 11/2018 | Maser | |
| 10,648,964 B2 | 5/2020 | Rice et al. | |
| 10,670,323 B2 | 6/2020 | Alexander et al. | |
| 10,722,427 B2 | 7/2020 | Cantor | |
| 10,878,364 B2 | 12/2020 | Burch et al. | |
| 10,989,466 B2 | 4/2021 | Alexander et al. | |
| 11,017,346 B2 | 5/2021 | Burch et al. | |
| 11,162,716 B2 | 11/2021 | Alexander et al. | |
| 11,172,585 B1 | 11/2021 | Smith, III | |
| 11,216,846 B2 | 1/2022 | Cotte et al. | |
| 11,270,247 B2 | 3/2022 | Cotte et al. | |
| 11,365,926 B2 | 6/2022 | Alexander et al. | |
| 11,434,039 B2 | 9/2022 | Limousin et al. | |
| 11,436,460 B2 | 9/2022 | Cotte et al. | |
| 11,526,833 B2 | 12/2022 | Burch et al. | |
| 11,568,353 B2 | 1/2023 | Davis et al. | |
| 11,668,508 B2 | 6/2023 | Alexander et al. | |
| 11,713,163 B2 | 8/2023 | Cotte et al. | |
| 11,731,824 B2 | 8/2023 | Cotte et al. | |
| 11,737,453 B2 | 8/2023 | Hoffmann et al. | |
| 11,767,147 B2 | 9/2023 | Affre De Saint Rome et al. | |
| 11,807,431 B2 | 11/2023 | Cotte et al. | |
| 11,857,048 B2 | 1/2024 | Hugues | |
| 11,939,106 B2 | 3/2024 | Guilloux et al. | |
| 11,995,605 B2 | 5/2024 | Cotte et al. | |
| 12,056,654 B1 | 8/2024 | Chasteen et al. | |
| 2005/0241978 A1 | 11/2005 | Plue et al. | |
| 2007/0193297 A1* | 8/2007 | Wilson | F25D 29/00 62/457.2 |
| 2009/0277187 A1 | 11/2009 | McGann | |
| 2011/0082437 A1 | 4/2011 | Stacey | |
| 2011/0083445 A1 | 4/2011 | Heyd et al. | |
| 2011/0168729 A1* | 7/2011 | Koenig | B65D 25/2858 220/768 |
| 2012/0312031 A1 | 12/2012 | Olsen | |
| 2013/0273752 A1 | 10/2013 | Rudisill | |
| 2016/0201359 A1* | 7/2016 | Berglund | G08B 13/1472 70/58 |
| 2016/0202111 A1 | 7/2016 | Fahey | |
| 2016/0239801 A1* | 8/2016 | Burch, V | G06Q 10/0838 |
| 2017/0177883 A1 | 6/2017 | Paterra et al. | |
| 2017/0180368 A1 | 6/2017 | Paterra et al. | |
| 2018/0164034 A1 | 6/2018 | Banks | |
| 2019/0003757 A1 | 1/2019 | Miros et al. | |
| 2019/0112119 A1 | 4/2019 | Alexander | |
| 2019/0333620 A1* | 10/2019 | Herman | A61J 7/0084 |
| 2020/0051015 A1 | 2/2020 | Davis | |
| 2020/0217575 A1 | 7/2020 | Thelin et al. | |
| 2020/0224964 A1* | 7/2020 | Alexander | F25D 11/003 |
| 2021/0404727 A1 | 12/2021 | Alexander et al. | |
| 2022/0004833 A1 | 1/2022 | Cotte | |
| 2022/0049890 A1 | 2/2022 | Alexander | |
| 2022/0055809 A1* | 2/2022 | Polycarpe | B65D 79/02 |
| 2022/0082317 A1 | 3/2022 | Bollinger et al. | |
| 2022/0104318 A1 | 3/2022 | Wang et al. | |
| 2022/0144503 A1 | 5/2022 | Guerdrum et al. | |
| 2022/0164762 A1* | 5/2022 | Bollinger | G06Q 10/083 |
| 2023/0087846 A1 | 3/2023 | Cotte | |
| 2023/0211918 A1* | 7/2023 | Affre De Saint Rome | B65D 11/1833 220/6 |
| 2023/0252397 A1 | 8/2023 | Choi et al. | |
| 2023/0264871 A1 | 8/2023 | Williams et al. | |
| 2023/0284614 A1 | 9/2023 | Anderson et al. | |
| 2023/0366255 A1* | 11/2023 | Farra | E05G 1/10 |
| 2023/0371729 A1* | 11/2023 | Williams | G07C 9/00896 |
| 2023/0385579 A1* | 11/2023 | Liu | G06K 7/1413 |
| 2024/0002127 A1 | 1/2024 | Nauta et al. | |
| 2024/0025598 A1 | 1/2024 | Lee et al. | |
| 2024/0199293 A1 | 6/2024 | Cotte et al. | |

FOREIGN PATENT DOCUMENTS

| | | | |
|---|---|---|---|
| CN | 202439951 U | 9/2012 | |
| CN | 210527362 U | 5/2020 | |
| CN | 112744424 A | 5/2021 | |
| CN | 215708287 U | 2/2022 | |
| FR | 3112761 A1 * | 1/2022 | B65D 11/1833 |
| GB | 2513106 A | 10/2014 | |
| GB | 2566792 A | 3/2019 | |
| JP | 3 302626 B2 | 7/2002 | |
| JP | 2018511782 A | 4/2018 | |
| JP | 2023526178 A | 6/2023 | |
| KR | 200 390 049 Y1 | 7/2005 | |
| KR | 20220027144 | 3/2022 | |
| KR | 2024 0016101 A | 2/2024 | |
| KR | 20240057651 A * | 5/2024 | H04W 4/80 |
| WO | WO 2016/120224 A1 | 8/2016 | |
| WO | WO 2018/222645 A1 | 12/2018 | |
| WO | WO 2019/204660 A1 | 10/2019 | |
| WO | WO 2021/202147 | 10/2021 | |
| WO | WO 2022/104318 | 5/2022 | |
| WO | WO 2023/150115 | 1/2023 | |
| WO | WO-2023150115 A1 * | 8/2023 | G06Q 10/0833 |
| WO | WO 2023/174497 A1 | 9/2023 | |
| WO | WO 2024/041982 | 2/2024 | |

OTHER PUBLICATIONS https://livingpackets.com/the-box-pro, available prior to Jul. 15, 2024; printed on Aug. 30, 2024.

https://livingpackets.com/the-tablet, available prior to Jul. 15, 2024; printed on Aug. 30, 2024.

International Search Report and Written Opinion dated Jul. 23, 2025, received in International Patent Application No. PCT/US2025/026053, in 16 pages.

Office Action dated Sep. 9, 2025, received in Japanese Patent Application No. JP 2025-090957 A, in 3 pages.

European Search Report regarding Application No. 25173792.0, received Oct. 23, 2025, 12 pages.

* cited by examiner

REUSABLE PORTABLE SHIPPING CONTAINER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a portable shipping container, and more particularly to a reusable portable shipping container.

Description of the Related Art

Portable coolers are used to store products (e.g., liquids, beverages, medicine, organs, food, etc.) in a cooled state. Some are Styrofoam containers that are often filled with ice to keep the product in a cooled state. However, the ice eventually melts, soaking the products and requiring the emptying of the liquid. Such coolers can also leak during transport, which is undesirable. Additionally, such coolers are undesirable for transporting goods across long distances due to their inability to maintain the product in a cooled state, the melting of ice and/or possible leaking of liquid from the cooler. Therefore, such coolers are undesirable for use with temperature sensitive products (e.g., vaccines, medicine, bodily fluid samples, tissue samples, organ transplants, etc.). This can result in the non-usability of the products in the cooler. For example, once potency of medicine (e.g., a vaccine) is lost, it cannot be restored, rendering the medicine ineffective and/or unusable. Another drawback of existing containers is that they are single-use containers (e.g., made of cardboard, Styrofoam) that end up in the landfills after a single use, resulting in significant amount of waste. Another drawback of existing containers, even ones meant to be reusable is difficulty in achieving return of the reusable containers due to user inaction or improperly displayed labels.

SUMMARY

Accordingly, there is a need for improved portable shipping container designs (e.g., for transporting medicine, such as vaccines, insulin, epinephrine, vials, cartridges, injector pens, organ transplants, laboratory samples such as blood, urine, stools samples, tissue, etc.) that can maintain the contents of the cooler at a desired temperature or temperature range. Additionally, there is a need for reusable portable shipping container with electronics that can monitor the payload temperature and that is modular to allow use of the same electronics (e.g., electronic display screen) with various different sized containers that accommodate different sizes of payloads.

In some aspects, the techniques described herein relate to a reusable portable shipper container, including: a container body having an insulated payload chamber configured to receive one or more goods; an insulated lid actuatable to selectively close or access the payload chamber; one or more sensors disposed in the payload chamber and operable to sense a parameter of the payload chamber or of the goods; and a tablet removably coupleable to the container body and including: an electronic display screen, one or more power storage devices, and circuitry configured to wirelessly communicate with the one or more sensors in the payload chamber and to store sensor data communicated by the one or more sensors in the payload chamber, wherein the container body includes a lock biased toward engagement with the tablet when the tablet is attached to the container body to retain the tablet attached to the container body, the lock embedded within the container body so it is not visible when the tablet is attached to the container body and the lid is in an open position, the lock configured to be movable to a retracted position when the lid is in the open position to facilitate at least partial detachment of the tablet from the container body to facilitate decoupling and removal of the tablet from engagement with the container body.

In some aspects, the techniques described herein relate to a reusable portable shipper container, including: a container body having an insulated payload chamber configured to receive one or more goods; an insulated lid actuatable to selectively close or access the payload chamber; one or more sensors disposed in the payload chamber and operable to sense a parameter of the payload chamber or of the goods; and a tablet removably coupleable to the container body and including: an electronic display screen, one or more power storage devices, and circuitry configured to communicate with the one or more sensors in the payload chamber, wherein the container body includes a lock biased toward engagement with the tablet when the tablet is attached to the container body to retain the tablet attached to the container body, the lock embedded within the container body so it is not visible when the tablet is attached to the container body, the lock configured to be movable to a retracted position when the lid is in the open position to facilitate at least partial detachment of the tablet from the container body to facilitate decoupling and removal of the tablet from engagement with the container body.

In some aspects, the techniques described herein relate to a reusable portable shipper container, including: a container body having an insulated payload chamber configured to receive one or more goods; an insulated lid actuatable to selectively close or access the payload chamber; one or more sensors disposed in the payload chamber and operable to sense a parameter of the payload chamber or of the goods; and a tablet removably coupleable to the container body and including: an electronic display screen, one or more power storage devices, and circuitry configured to communicate with the one or more sensors in the payload chamber, wherein the container body includes a lock to engage the tablet when the tablet is attached to the container body to retain the tablet attached to the container body, the lock configured to be movable to a retracted position to facilitate at least partial detachment of the tablet from the container body to facilitate decoupling and removal of the tablet from engagement with the container body.

DETAILED DESCRIPTION

Figure 1:
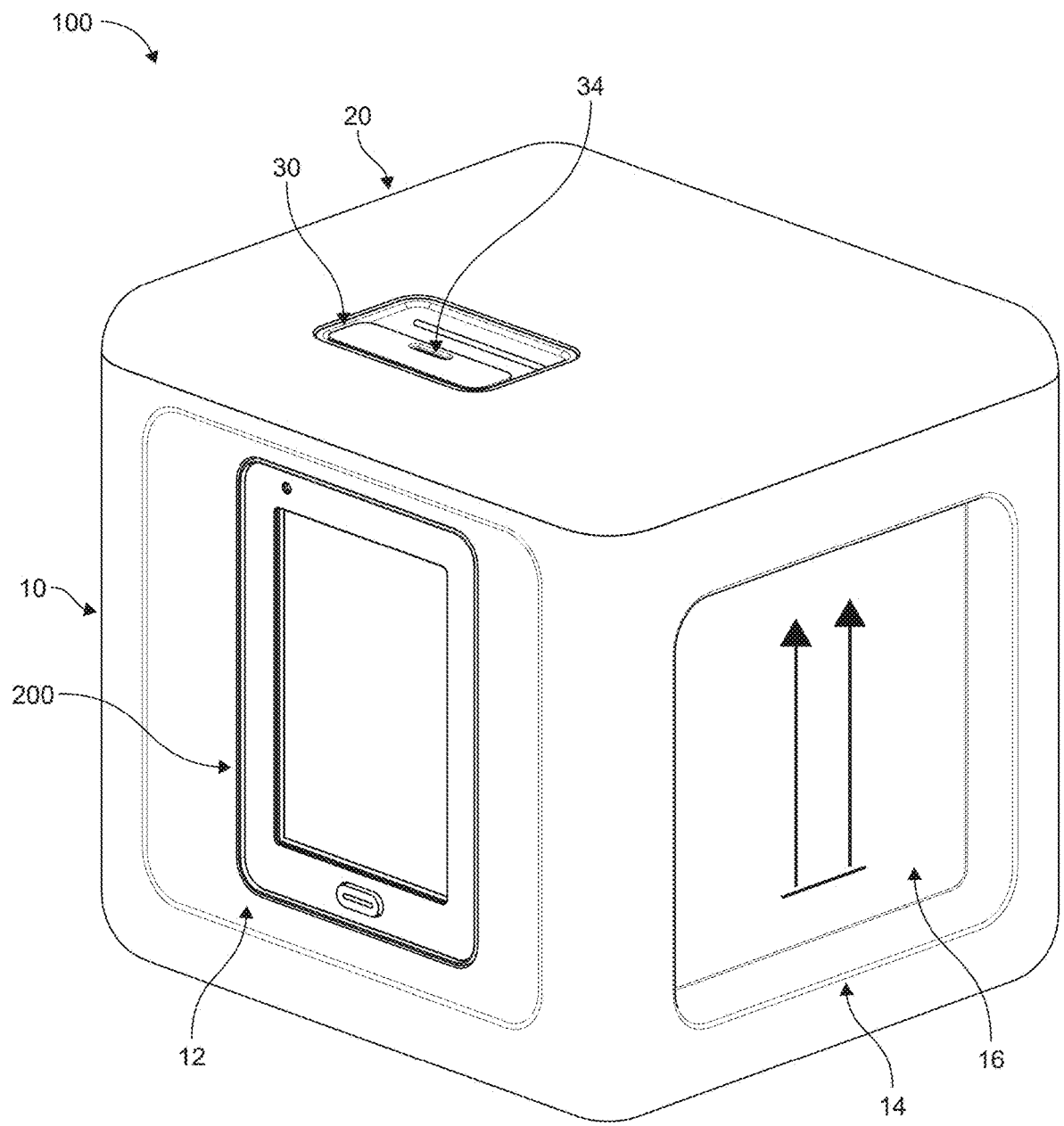
FIG. 1 is a schematic perspective view of a portable shipping container.

FIGS. 1-5E shows a portable shipping container 100 (or shipper container). The shipper container 100 has a container body 10 with a payload chamber 18, a lid 20 and a tablet 200 (e.g., tablet display screen). The shipper container 100 is advantageously reusable to deliver goods. In one example, the goods can be temperature sensitive goods. In one example, the temperature sensitive goods can be temperature sensitive medical goods (e.g. medicine, such as vaccines, insulin, epinephrine, vials, cartridges, injector pens, organ transplants, laboratory samples such as blood, urine, stools samples, tissue, etc.). The reusability of the shipper container 100 advantageously reduces waste (e.g., as compared with conventional cardboard and Styrofoam containers that end up in landfills after one use).

In one example, the lid 20 can be pivotally coupled to the container body 10 (e.g., via a living hinge or one or more hinges). In another example, the lid 20 can be completely detachable from the container body 10 to access the payload chamber 18 of the container body 10. In another example, the lid 20 can be slidable relative to container body 10 and then pivotable to open the lid 20 relative to the container body 10 to access the payload chamber 18. In one example, the lid 20 can be flush with the sides of the container body 10 when the lid 20 is in a closed position. The lid 20 can be made of or include a thermally insulative and resilient material, such a foam material. In one example, the lid 20 can be made of or include expanded polypropylene foam. The lid 20 can include an insulated panel 22 (e.g., vacuum insulated panel, as shown in FIG. 5B) to enhance (e.g., improve, increase, maintain) insulation of the contents in the container body 10 as further discussed below.

Figure 9:
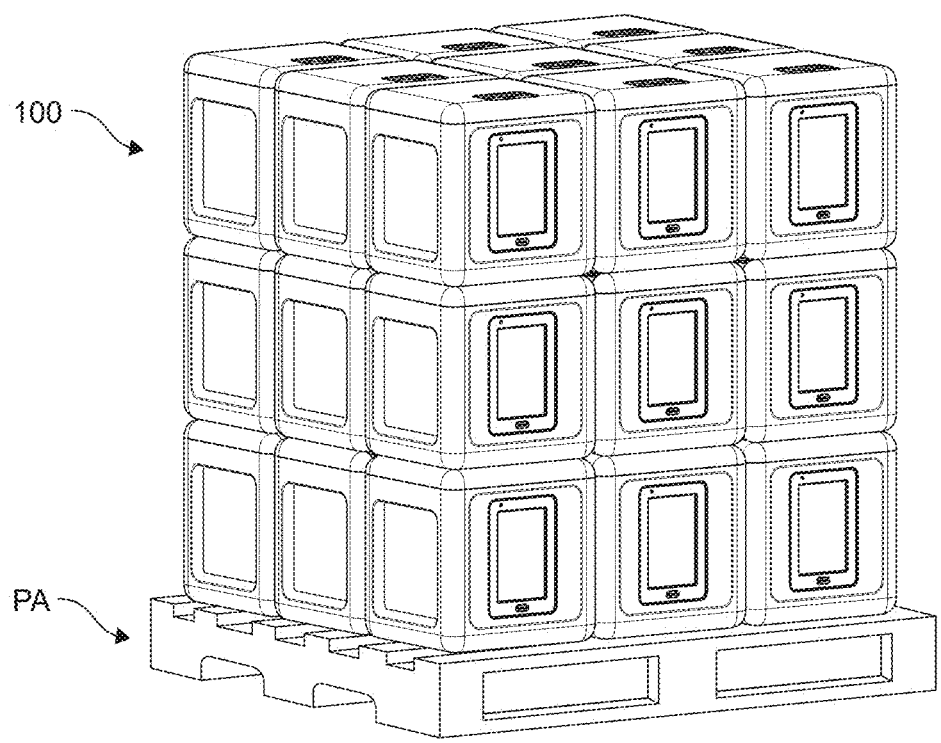
FIG. 9 shows multiple portable shipping containers stacked on a pallet.

The lid 20 can include a latch assembly 30 embedded in the lid 20. The latch assembly 30 includes a latch handle 32 actuatable to unlock the lid 20 from the container body 10. In one example, the latch handle 32 is coplanar or flush with the top surface of the lid 10, allowing the shipper containers 100 to be stacked (as shown in FIG. 9) without the latch handle 32 interfering with the stacking or unstacking process. The latch assembly 30 also includes an opening or slot 34 in the latch handle 32 and a bar 36 spaced from the latch handle 32. Advantageously, the latch handle 32 can be locked by installing a zip tie or band through the slot 34 and attaching it to the bar 36 to inhibit (e.g., prevent) actuation (e.g. inadvertent actuation) of the latch handle 32 to unlock the lid 20 and move the lid 20 to the open position relative to the container body 10 until the zip tie or band is removed (e.g., cut). In another implementation, the bar 36 can be replaced with a flanged portion of the latch assembly 30 that is spaced from the latch handle 32 and also has a slot through which the zip tie or band can extend to lock the latch handle 32 and inhibit (e.g., prevent) the lid 20 from opening relative to the container body 10. In another example, additionally or alternatively, the lid 20 can lock when in the closed position relative to the container body 10. For example, the lid 20 can have a magnet and the container body 10 can have an electromagnet actuated to apply an attractive magnetic force on the magnet in the lid 20 to inhibit (e.g., prevent) opening of the lid 20 relative to the container body 10. The lid 20 can be selectively unlocked relative to the container body 10 to allow opening of the lid 20, for example by deactivating the electromagnet in the container body 10 to remove said attractive magnetic force between the container body 10 and the lid 20. In one example, the lid 20 can be automatically unlocked (e.g., said attractive magnetic force between the container body 10 and the lid 20 removed) when the shipper container 100 arrives at the recipient address (e.g., as confirmed by one or more GPS sensors of the tablet 200).

In one example, the container body 10 and the lid 20 (when in the closed position) define the shipper container 100 with a generally cube shape. In one example, the shipper container 100 can have a length, width and height, each of approximately one foot. The container body 10 can be made of or include a thermally insulative and resilient material, such a foam material. In one example, the container body 10 can be made of or include expanded polypropylene foam. The container body 10 has recessed surfaces 12 and cut outs 14 that advantageously reduce the overall weight of, and reduce the cost of manufacturing of, the shipper container 100. In one example, two sides (e.g., front side in FIG. 1 and opposite rear side) can have recessed surfaces 12 and the other three sides (e.g., left side, right side and base) can have the cut outs 14. In another example, one side (e.g., front side in FIG. 1) can have the recessed surface 12 and the other four sides (e.g., left side, right side, rear side and base) can have the cut outs 14. The container body 10 can include recessed surfaces 16 in the cutouts that can be made of hard plastic or other impact resistant material. In one example, the recessed surfaces 16 can be part of or define a vessel V made of or including hard plastic or other impact resistant material that is at least partially embedded in, or surrounded by, the thermally insulative and resilient material (e.g., foam material), and the vessel can define the payload chamber 18 (see FIG. 3).

The container body 10 can have an opening 11 via which a payload chamber 18 (e.g., open or hollow cavity) in the container body 10 can be accessed. The lid 20 can have a protruding portion 24 (e.g., a stepped portion) that extends into the opening 11 to seal the payload chamber 18 when the lid 20 is in the closed position relative to the container body 10. In one example, the insulated panel 22 can be disposed in (e.g. embedded in) the protruding portion 24. The latch handle 32 is connected to one or more hooks 32A, 32B that are operable to engage (e.g., hook onto, couple to) one or more slots or openings 13A, 13B in the container body 10 (e.g., in a wall of the container body 10) to couple the lid 20 to the container body 10. When the latch handle 32 is actuated (e.g., pulled), this causes the one or more hooks 32A, 32B to disengage from the slots or openings 13A, 13B, allowing the lid 20 to be opened relative to the container body 10 (e.g., to access the payload chamber 18).

In one example, the payload chamber 18 can have a length, width and height of approximately 6 inches×8 inches×7½ inches. However, the payload chamber 18 can have other suitable dimensions smaller or larger than these dimensions. The payload chamber 18 can be sized to receive one or more (e.g., multiple) goods G, such as temperature sensitive medical goods, one or more packs P (e.g., gel packs) of thermal mass or phase change material (PCM), and (optionally) one or more buffer pads B (e.g., cardboard pieces) that can (optionally) be interposed between the goods (e.g., temperature sensitive medical goods) G and the one or more packs P. In one example, shown in FIG. 4, a pack P is disposed below and above the goods (e.g., temperature sensitive medical goods) G, with buffer pads B disposed therebetween. However, in other examples, only a pack P above the goods (e.g., temperature sensitive medical goods) G is used (with or without a buffer pad B in between). As shown, for example, in FIG. 5B, the payload chamber 18 can be defined by or surrounded by insulated panels 19 (e.g. vacuum insulated panels) on all sides (e.g., five sides) of the payload chamber 18 to enhance (e.g., improve, increase, maintain) insulation of the goods (e.g., temperature sensitive medical goods) G in the payload chamber 18 in the container body 10. In one example, the insulated panels 19 are separate planar panels that are assembled together (e.g., taped together, adhered together) into an integral unit. In another example, the insulated panels 19 are part of a monolithic seamless insulated vessel that defines or surrounds the payload chamber 18.

Figure 2:
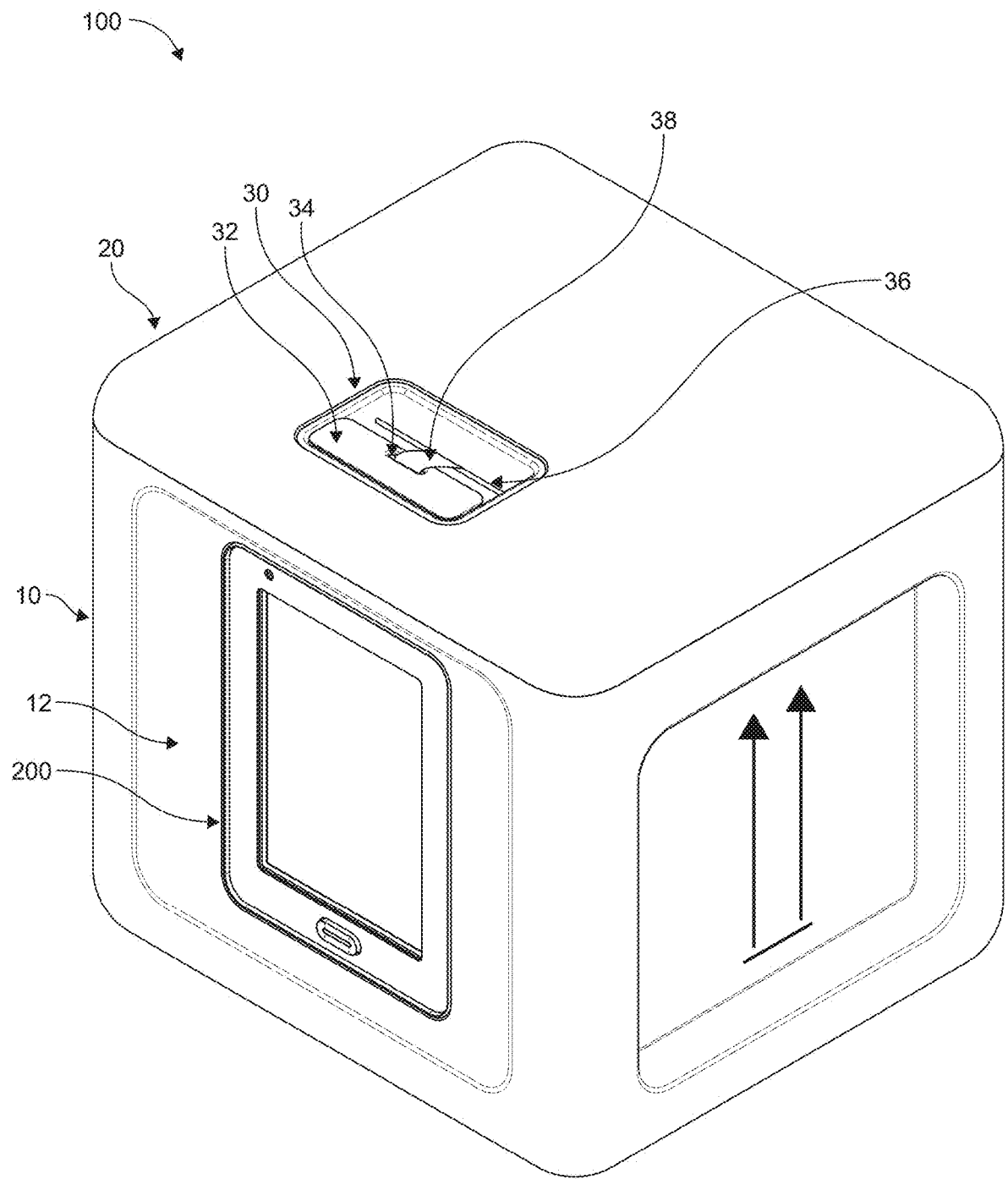
FIG. 2 is a schematic partial view of the portable shipping container in FIG. 1 with the lid closed.
Figure 3:
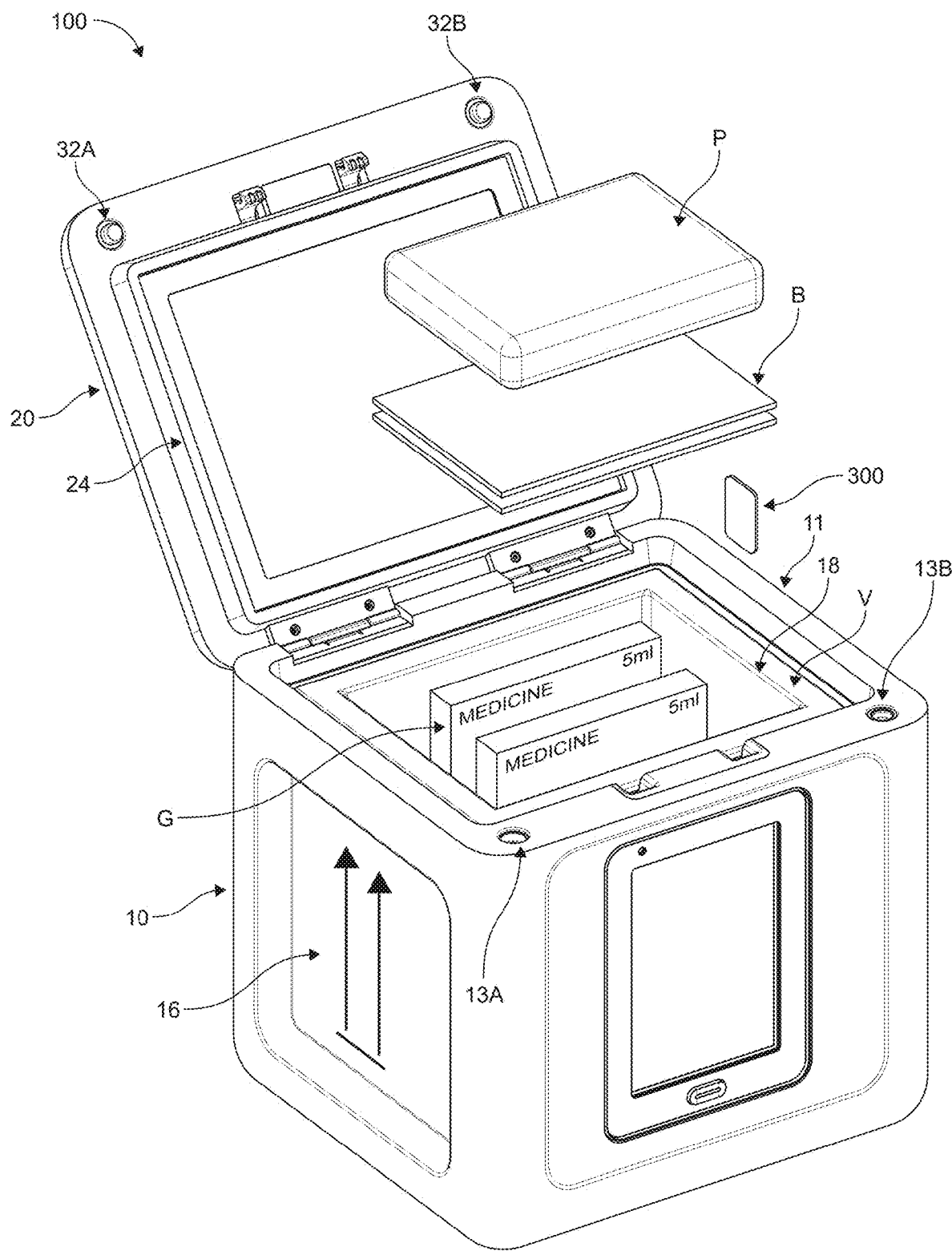
FIG. 3 is a schematic partial view of the portable shipping container in FIG. 1 with the lid open.
Figure 4:
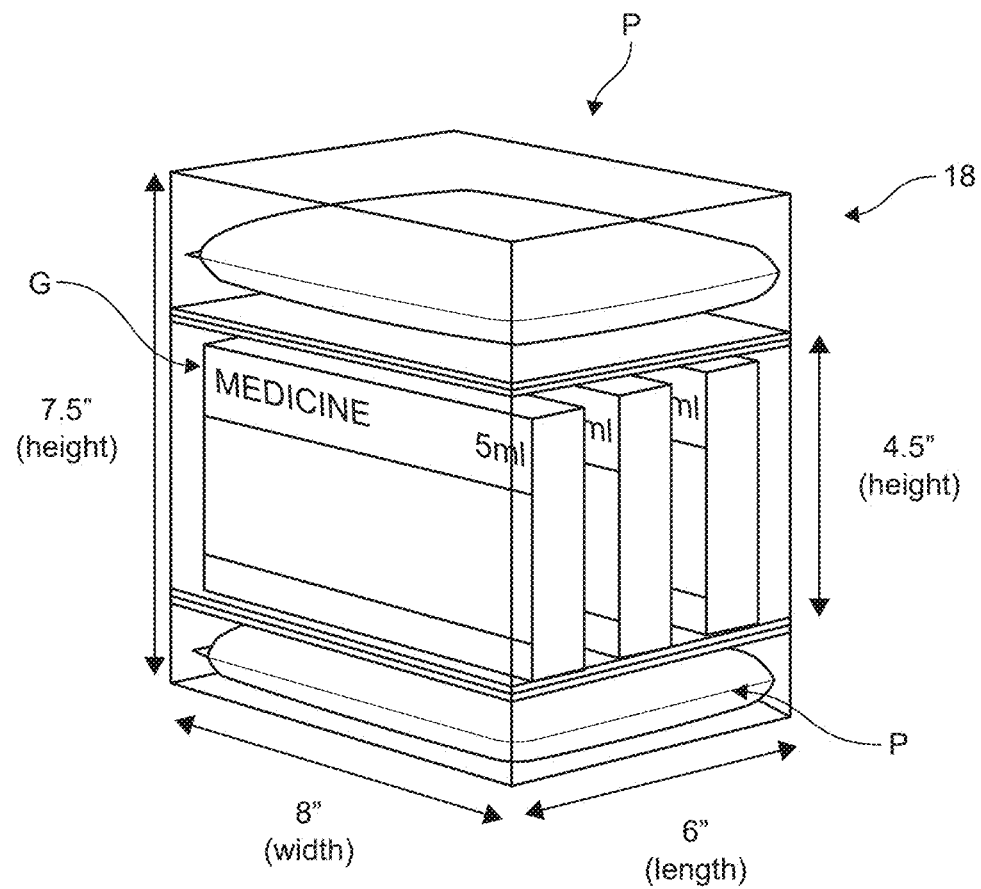
FIG. 4 is a schematic view of contents in a payload chamber of the portable shipping container in FIG. 1.
Figure 5A:
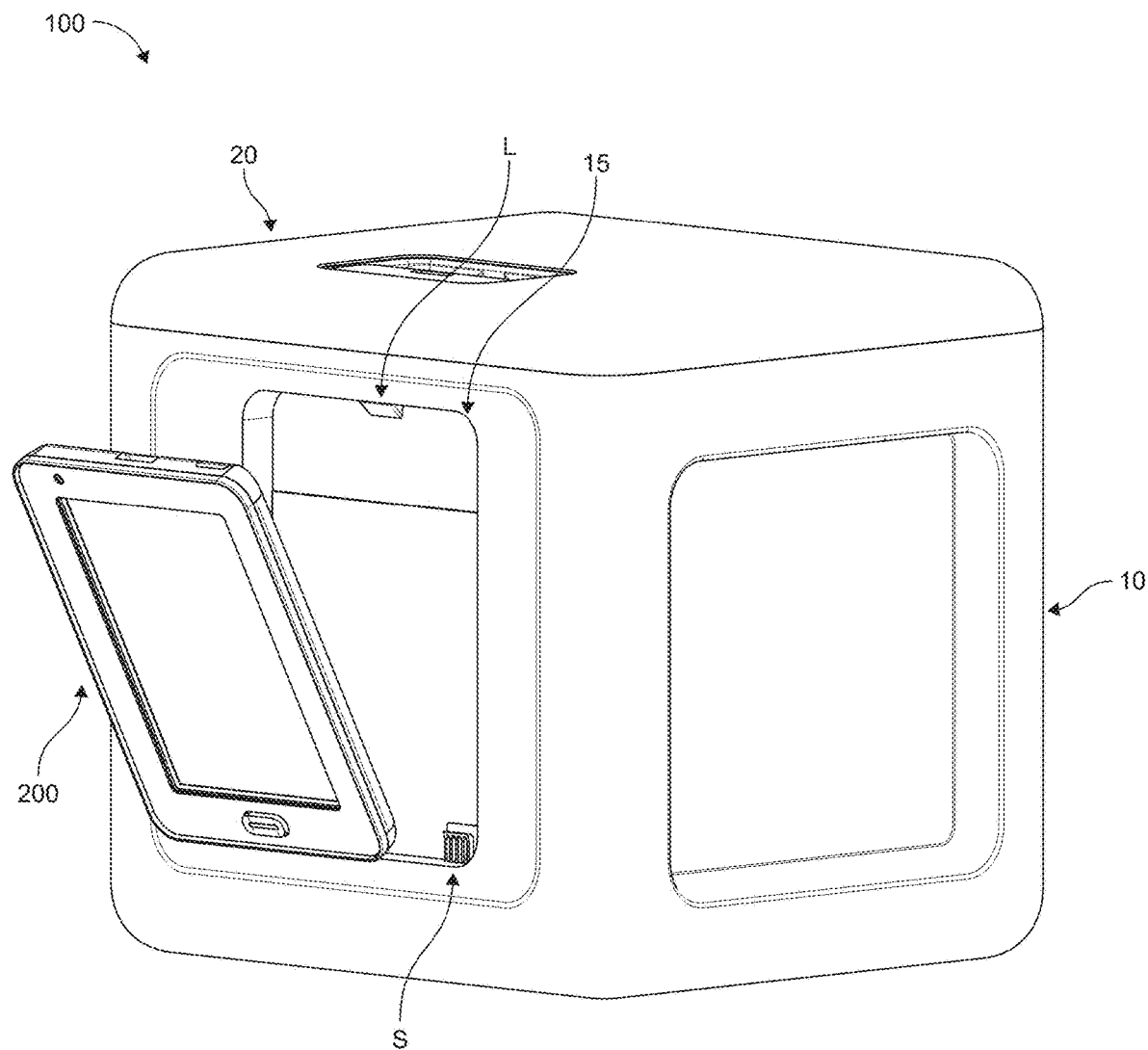
FIG. 5A is a schematic perspective view of the portable shipping container of FIG. 1 with the tablet being attached to the container body.
Figure 5B:
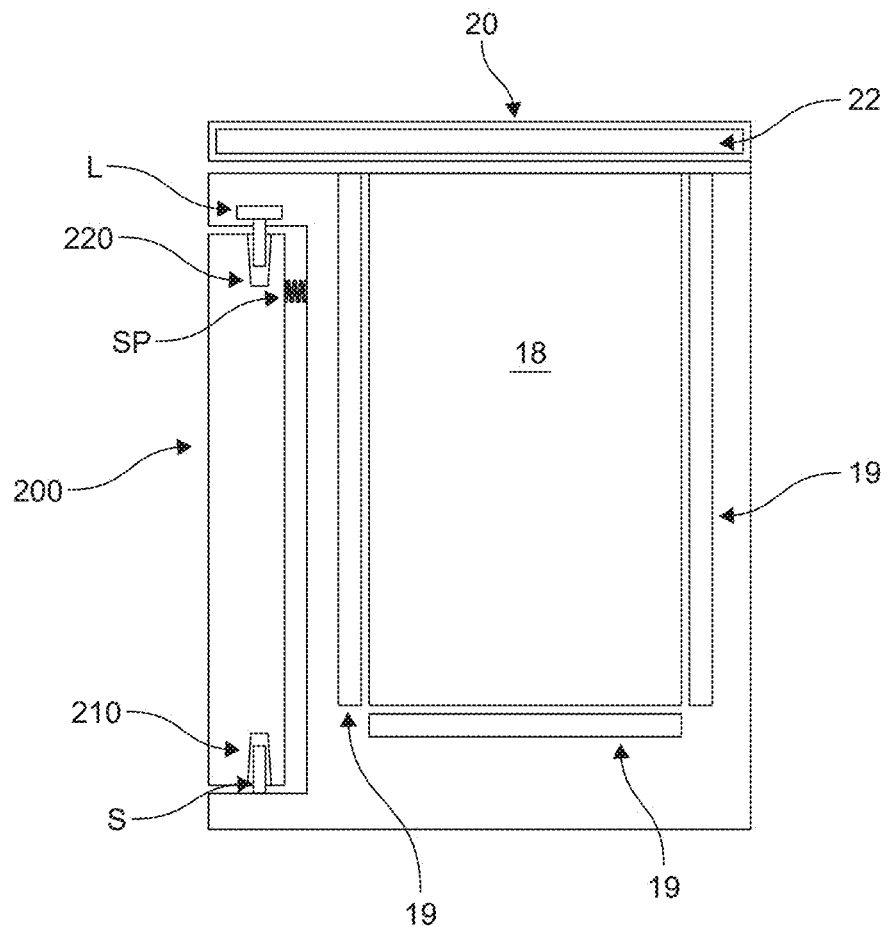
FIG. 5B is a schematic side view of the portable shipping container with the tablet attached to the container body.

With reference to FIGS. 5A-5E, the tablet 200 can be detachable from the container body 10 (e.g., removably coupleable to the container body 10), as shown for example in FIG. 5A, which provides various advantages to the shipper container 100, as further discussed below. When coupled to the container body 10, the tablet 200 can be flush with the recesses surface 12 (as shown in FIGS. 1-2), with the body of the tablet 200 extending into a recess 15 (see FIG. 5A). One or more supports S in the recess 15 can removably or releasably couple to (e.g., releasably engage) and support the tablet 200 and one or more locks L that extend into the recess 15 can lock (e.g., couple to) the tablet 200 when it is in the recess 15. The one or more supports S and one or more locks L can therefore retain the tablet 200 in the recess 15 when the tablet 200 is coupled to the container body 10, and inhibit (e.g., prevent) the unintended decoupling or removal of the tablet 200 from the container body 10.

Figure 5C:
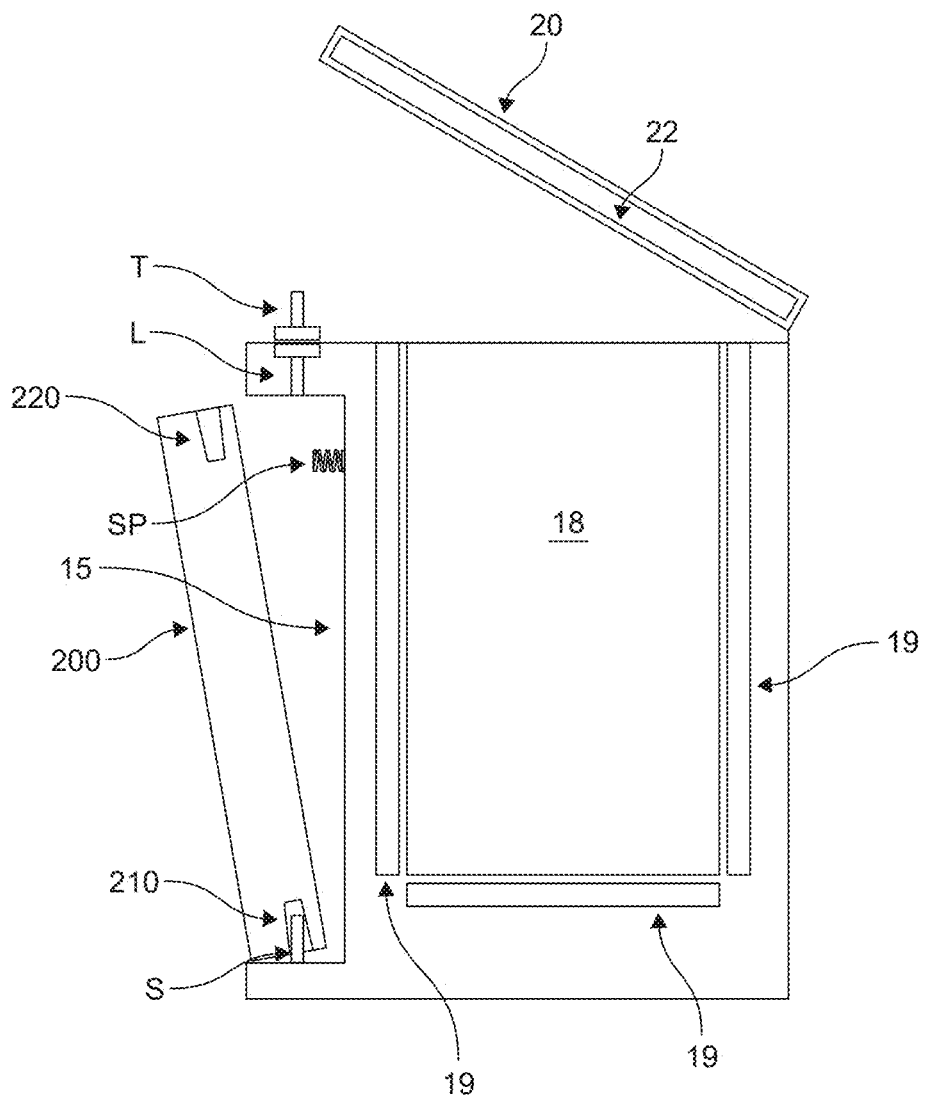
FIG. 5C is a schematic cross-sectional side view of the portable shipping container with the tablet being detached from the container body.

With reference to FIGS. 5B-5C, in one example the tablet 200 has one or more slots 210 at a lower end thereof that receives the one or more supports S. In one example, the one or more slots 210 are female slots and the one or more supports S are male shaped members. In one example, the one or more supports S provide an electrical connection, a well as a mechanical connections, between the container body 10 and the tablet 200 (e.g., both the one or more supports S and one or more slots 210 are made of or include electrically conductive material, such as metal). In another example, the one or more supports S only provide a mechanical connection between the container body 10 and the tablet 200 and the tablet 200 has electrical contacts (not shown) that contact electrical contacts on the container body 10 (e.g., in the recess 15). The tablet 200 also has one or more slots 220 at an upper end thereof (e.g., opposite end from the one or more slots 210). The one or more slots 220 can be female slots that receive the one or more locks L therein. The one or more locks L can be spring loaded (or biased) toward the lock position (shown in FIG. 5B) in which the one or more locks L extend into the one or more slots 220. The one or more locks L can be magnetically actuated or movable (see FIG. 5C) using a tool T to move the one or more locks L to the retracted position (e.g., move the one or more locks L out of the one of more slots 220), allowing the tablet 200 to at least partially decouple from the container body 10 and move away from the recess 15. In one example, the one or more locks L can be a magnet or be made of a magnetic material, and the tool can be or include a magnetic material or be a magnet, respectively. Therefore, when the tool T is placed proximate the one or more locks L, the magnetic attraction force between the two can cause the one or more locks L to move to the retracted position and out of the one or more slots 220 to decouple the tablet 200 from the container body 10. Advantageously, the one or more locks L can therefore be hidden from view (e.g., not visible) to prevent unwanted decoupling of the tablet 200 from the container body 10 (e.g., by a user, by a bystander), to inhibit (e.g., prevent) the tablet 200 from being detached from the container body 10 and stolen. In another example, the lock L can be or include an electronic solenoid (e.g., solenoid actuator, solenoid motor) actuatable to move locking member (e.g., plunger, piston or rod) into engagement with the tablet 200 when the tablet 200 is attached to the container body 10 to retain the tablet 200 attached to the container body 10. The lock L (e.g., plunger, piston or rod of the lock L) is operable to move or movable to a retracted position via the electronic solenoid when the lid 20 is in the open position to allow the tablet 200 to at least partially detach from the container body 10 to facilitate decoupling and removal of the tablet 200 from engagement with the container body 10. The lock L (e.g., plunger, piston or rod of the lock L) is operable to move to an extended position via the electronic solenoid when the lid 20 is in the closed position and the tablet 200 is disposed in the recess 15 adjacent the container body 10 to retain or maintain the tablet 200 in a coupled or attached position to the container body 10.

In one example, one or more springs SP are optionally disposed in the recess 15 and are compressed when the tablet 200 is coupled to the container body 10 and disposed in the recess 15. When the one or more locks L are retracted (to move out of the one or more slots 220), the one or more springs SP facilitate (e.g., aid in, assist in) decoupling the tablet 200 from the container body 10 by pushing the tablet 200 out of the recess 15. In another example the one or more springs SP are excluded. Advantageously, the one or more supports S remain engaged with the one or more slots 210 (as shown in FIG. 5C) to inhibit (e.g., prevent) the tablet 200 from falling completely out of the recess 15, thereby inhibiting (preventing) damage to the tablet 200 which may occur if it fell in an unimpeded manner out of the recess 15. This allows a user to simply pick up the tablet 200 (once it has been unlocked from the recess 15 by retracting the one or more locks L out of the one or more slots 220) to remove it from over the one or more supports S.

Figure 5D:
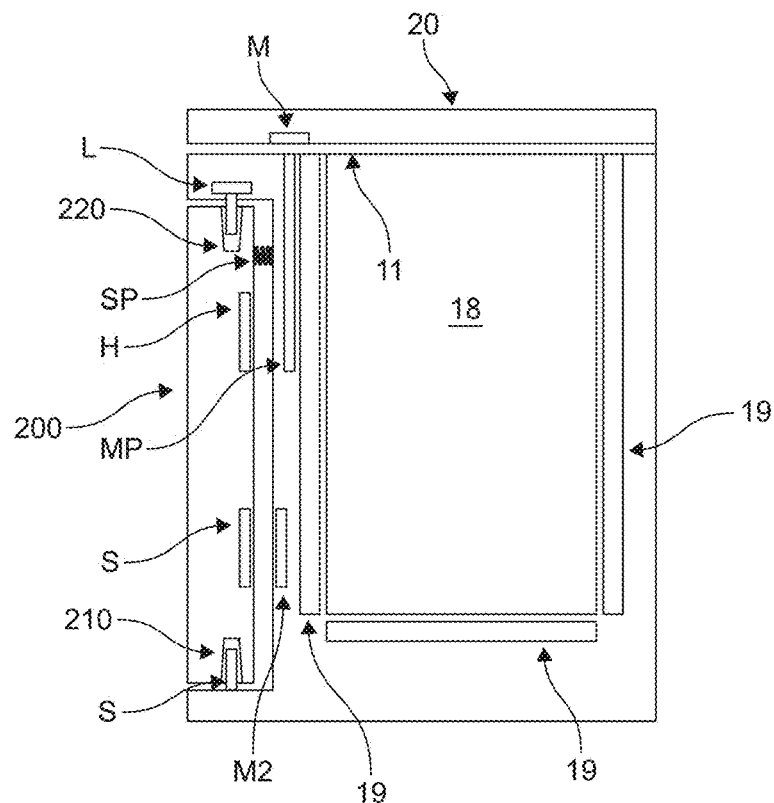
FIG. 5D is a schematic cross-sectional side view of the portable shipping container showing a lid detection circuit.

With reference to FIG. 5D, the shipper container 100 can have a lid detection system for detecting when the lid 20 is opened. For ease of illustration, the insulated panel 22 in the lid 20 is excluded from FIG. 5D. The lid 20 can include a magnet M (e.g., embedded therein, proximate a surface of the lid 20 that contacts the container body 10 when the lid 20 is in the close position. A metal rod MP (e.g., made of steel) can be embedded in the container body 10 (e.g., in the vessel V) and, for example, extend from a proximal end at or proximate the opening 11 of the container body 10 to a distal end in the container body 10. In the illustrated example, the metal rod MP extends from a proximal end at a location opposite (e.g., aligned with) the magnet M when the lid 20 is closed to a distal end of the metal rod MP in the container body 10. The tablet 200 can optionally have a sensor (e.g., Hall effect sensor) H that senses the magnetic signal from the metal rod MP, which it communicates when the lid 20 is closed so that the magnet M is proximate the end of the metal rod MP. The tablet 200 can use the signal generated via the Hall effect sensor to determine when the lid 20 has been opened (e.g., when a user has accessed the goods, such as temperature sensitive medical goods, G delivered to them with the shipper container 100). The container body 10 can optionally have a magnet M2 on or embedded in the container body 10 at or proximate the recess 15 so that the magnet M2 faces the tablet 200 when the tablet 200 is coupled to the container body 10 (e.g., when the tablet 200 is inserted into the recess 15). The tablet 200 can have a sensor S. In one example, the sensor S is a Hall effect sensor that senses the magnet M2 when the tablet 200 is coupled to the container body 10 and communicate a signal to the circuitry 240 of the tablet 200 indicating the tablet 200 is connected to the container body 10. In another example, the magnet M2 is excluded and the sensor S senses when the tablet 200 is coupled to the container body 10 (e.g., when the tablet 200 is inserted into the recess 15) and communicates a signal to the circuitry 240 indicating the tablet 200 is coupled to the container body 10. In one example, the sensor S can be a proximity sensor. In another example, the sensor S can be an infrared sensor. In another example, the sensor S can be an ultraviolet sensor. In another example, the sensor S can be an ambient light sensor. In another example, the sensor S can be an accelerometer that detects specific movement associated with the coupling (e.g., latching) of the tablet 200 to the container body 10.

Figure 5E:
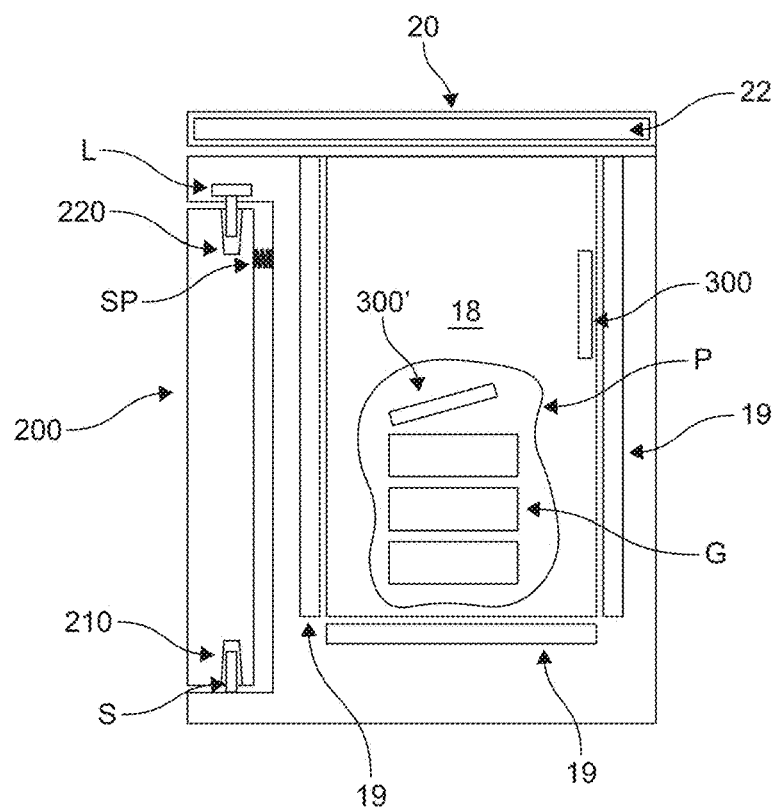
FIG. 5E is a schematic cross-sectional side view of the portable shipping container schematically showing the payload chamber and contents therein.

With reference to FIG. 5E, the shipper container 100 can have one or more sensor tags 300 (e.g., temp tags) attached (e.g., removably attached) to a surface of the payload chamber 18. The one or more sensor tags 300 can sense one or more environmental conditions or parameters in the payload chamber 18, such as for example temperature and/or humidity in the payload chamber 18, in real time and communicate the sensed payload environmental conditions or parameters (e.g., temperature and/or humidity) wirelessly with the electronics in the tablet 200, as further discussed below. In one example, the sensor tags 300 can be decoupled from the surface of the payload chamber 18, and optionally replaced by another sensor tag 300 (e.g., when it malfunctions, when its battery power runs out, etc.). Optionally, one or more sensor tags 300' (e.g., temp tags) can be included in the payload chamber 18, or example included within a package or bag P that holds the goods, such as temperature sensitive medical goods G (e.g., medicine, lab samples, biological samples, bodily fluid samples, human or animal tissue, human or animal organs) within the payload chamber 18. The one or more sensor tags 300' can sense one or more environmental conditions or parameters inside the package or bag P, such as for example, sense temperature and/or humidity inside the package or bag P (e.g., as a measurement of the temperature and/or humidity of the goods, such as temperature sensitive medical goods G) and wirelessly communicate the sensed environmental conditions or parameters inside the package or bag P (e.g., temperature and/or humidity) to the electronics in the tablet 200. In one example, the shipper container 100 includes both one or more sensor tags 300 and one or more sensor tags 300'. In another example, the shipper container 100 includes one or more sensor tags 300 but excludes sensor tags 300'. In another example, the shipper container 100 includes one or more sensor tags 300' but excludes sensor tags 300. The sensor tags 300, 300' can communicate wirelessly with the electronics in the tablet 200 via one or more of: WiFi, short-range wireless technology (e.g., Bluetooth®), a radio antenna, an LTE antenna, a cellular antenna, a radiofrequency (RF) transmitter, an infrared (IR) transmitter, and long range wireless technology.

Figure 6:
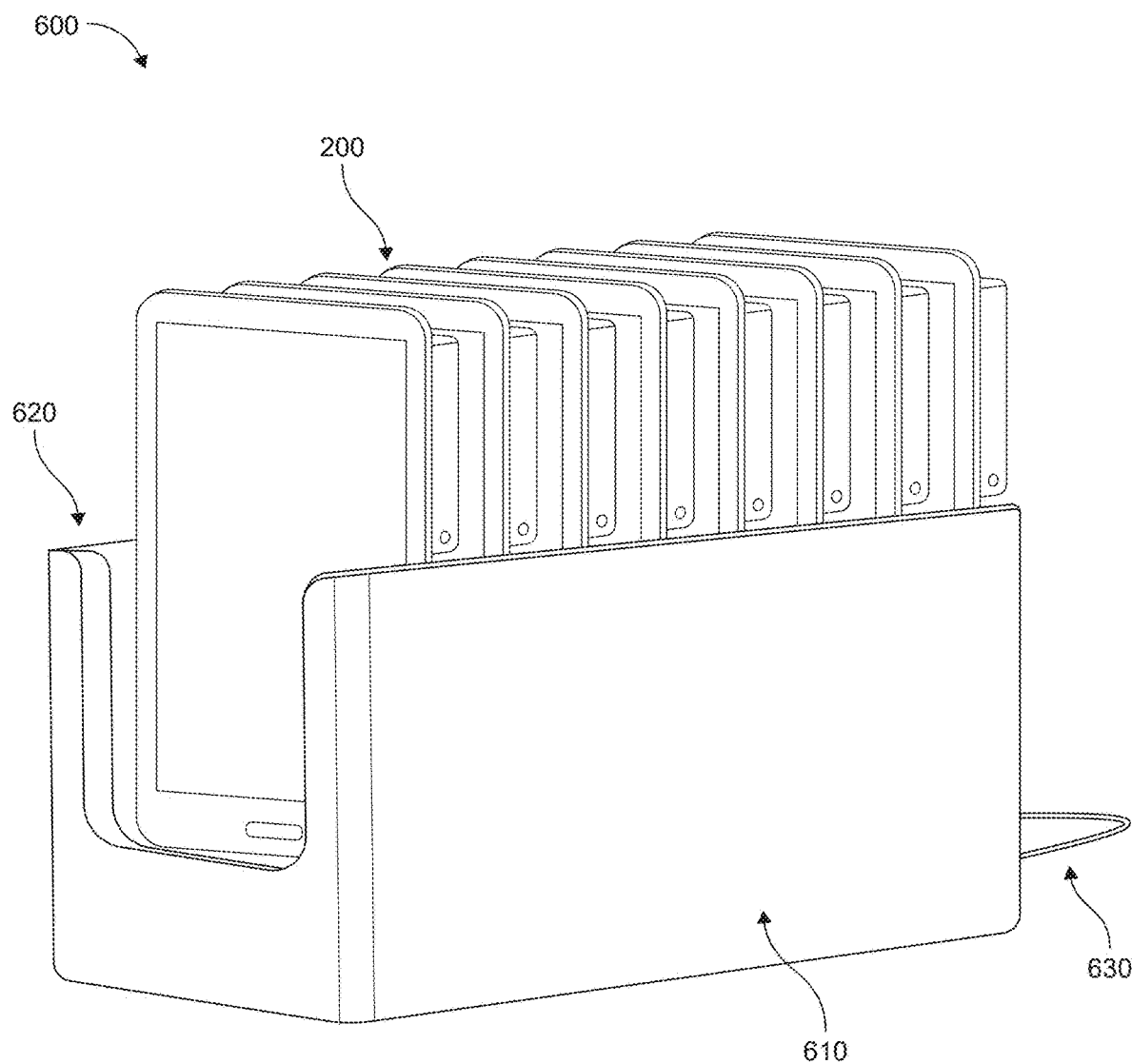
FIG. 6 shows a charging unit for the tablet.
Figure 7A:
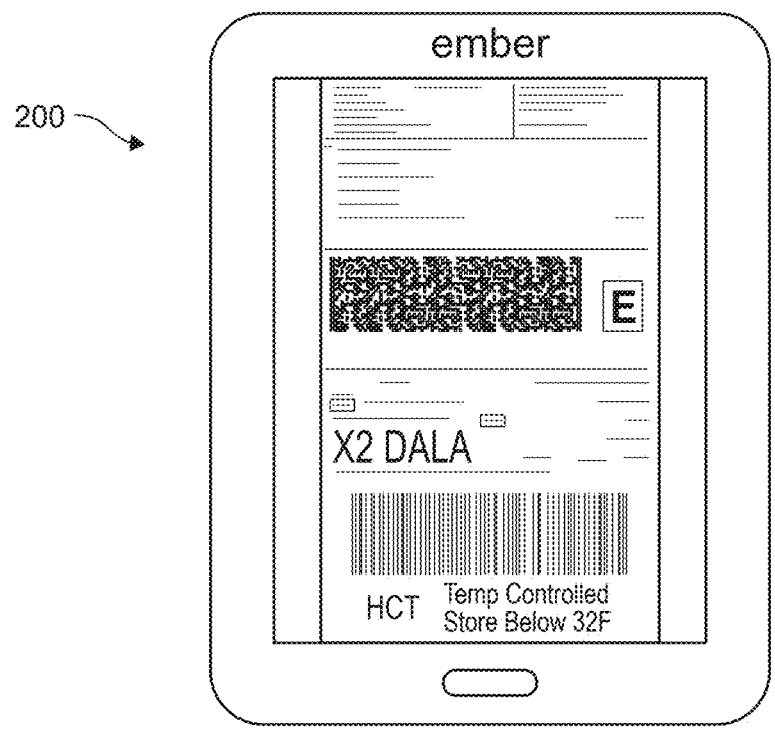
FIGS. 7A-7D show the tablet with different screen views.
Figure 7B:
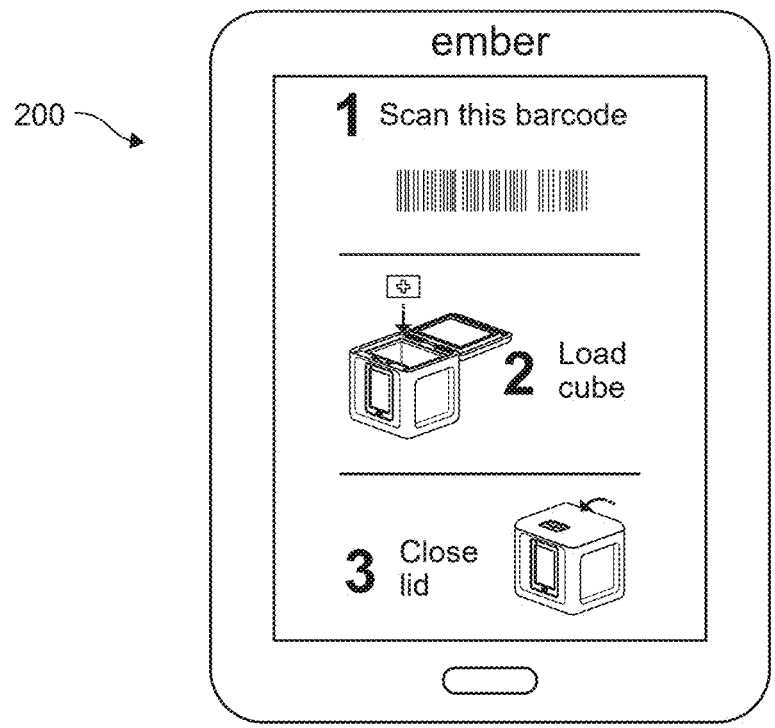
Figure 7C:
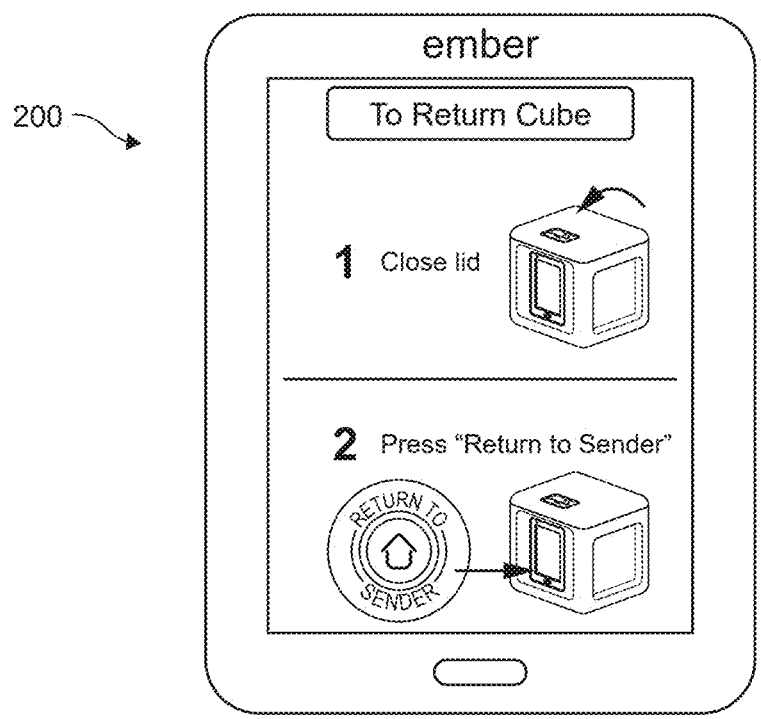
Figure 7D:
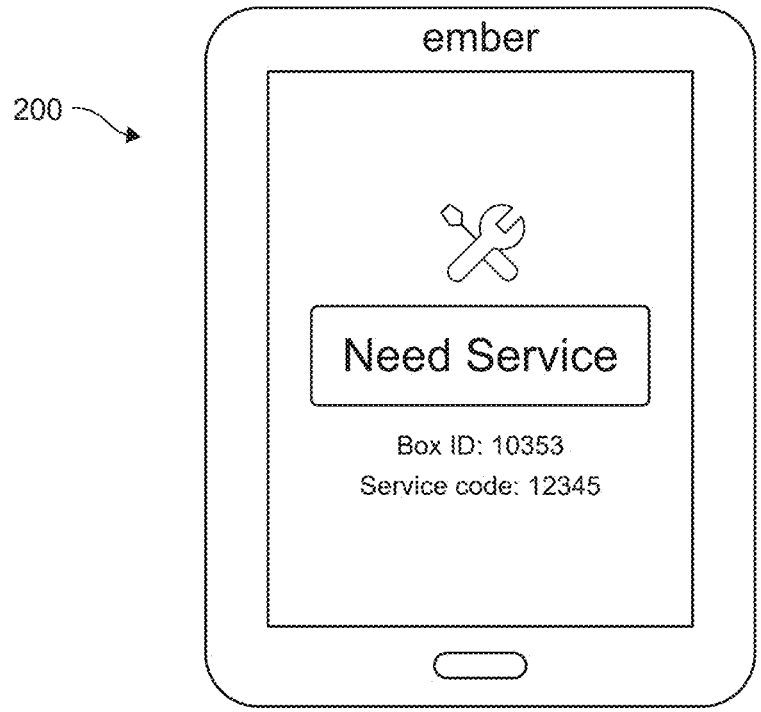
Figure 8:
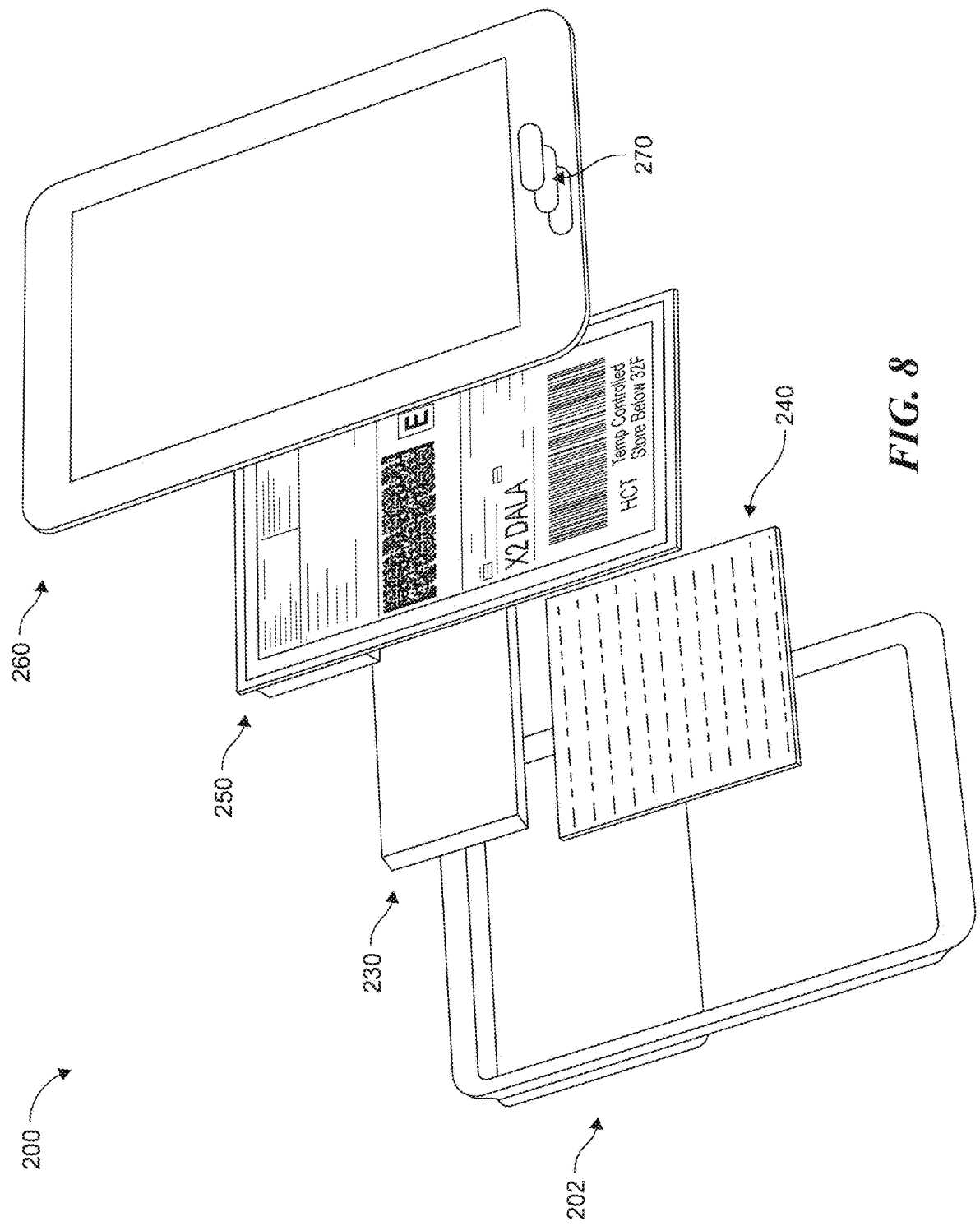
FIG. 8 shows a schematic exploded view of the tablet.

With reference to FIGS. 6-8, the tablet 200 can include a case 202, one or more power storage devices 230 (e.g., batteries such as Lithium ion batteries, capacitors such as super capacitors), circuitry 240 (e.g., including one or more computer processors, one or more memories, one or more antennas such as short-range wireless antennas, radio antennas, LTE antennas, RF receiver or transceiver, and IR receiver or transceiver, one or more electrical inputs and one or more electrical outputs, sensors such as Hall effect sensors, GPS sensors, motion sensors), a display screen 250 (e.g., an electronic ink or electronic paper, or electrophoretic display), a cover 260 and an actuatable (e.g., depressible) button 270. The one or more memories can be a computer readable storage medium (e.g., solid state drive, flash storage, magnetic storage), such as a non-transitory computer readable medium. In other examples, the one or more computer processors, one or more memories, one or more antennas, one or more electrical inputs and one or more electrical outputs can be on separate electronic components (e.g., not on the same circuitry). The button 270 can be actuated (e.g., touched, pressed, depressed) to provide an input to the circuitry 240 (e.g., via one or more electrical inputs of the circuitry 240). For example, the button 270 can be actuated to switch (e.g., toggle) between different display screens (see examples in FIGS. 7A-7D). In one example, actuation of the button 270 can automatically switch sender and recipient address information on the display of the tablet 200 and automatically alert a shipping carrier (e.g., UPS, FedEx, DHL) that the portable shipping container 100 is ready to be picked-up so that the shipping carrier picks up the portable shipping container 100. In another example, the tablet 200 can exclude the button 270. Instead, a shipping carrier (e.g., UPS, FedEx, DHL) can be alerted (e.g., automatically alerted wirelessly by circuitry of the tablet 200) to pick-up the portable shipping container 100 based, for example, on an indication that the lid 20 has been opened and/or another indication (e.g., GPS location or Geo fence of the portable shipping container 100 indicating that the portable shipping container 100 is at the recipient address).

In another example, the tablet 200 has a first side configured to receive a first printed label (e.g., shipping label with sender and recipient address information) thereon and a second side opposite the first side configured to receive a second printed label (e.g., shipping label with sender and recipient address information, for example different sender and/or recipient address information than on the first printed label) thereon. The tablet 200 can be removably coupled to the container body 10 in a first orientation to display the first printed label with the second side facing the container body 10 and the portable shipping container 100 be picked-up by the shipping carrier and shipped to the address on the first printed label. Once the portable shipping container 100 arrives at the delivery location, the tablet 200 can be removed, rotated so the second printed label faces away from the container body 10 and the tablet 200 be recoupled to the container body 10 in a second orientation to display the second printed label with the first side facing the container body 10, and the shipping carrier can be alerted to pick-up the portable shipping container 100 (e.g., upon receiving and alert signal that the portable shipping container 100 is ready for pick-up, as described above, such as based on an indication the lid 20 has been opened and GPS/Geo Fence information).

In one example, shown in FIG. 7A, the display screen 250 can display an electronic shipping label (e.g., with sender mailing address information such as street address information, recipient mailing address information such as street address information, and/or one or more machine readable codes, such as barcodes and QR codes). The display screen 250 can display temperature and/or humidity information (e.g., sensed temperature and/or humidity information the circuitry 240 wirelessly receives from the one or more sensor tags 300 and/or 300'). The shipping label information (e.g., sender and recipient mailing address information, machine readable codes) can be stored in the one or more memories of the tablet 200 to be displayed on the display screen 250. In one example, the shipping label information can be communicated to the tablet 200 (e.g., to the circuitry 240) wirelessly (e.g., from a user, from a remote electronic device, such as a desktop computer, laptop computer, tablet computer, mobile phone, remote server).

The circuitry 240 can optionally automatically switch sender and recipient address information on the electronic shipping label when the shipper container 100 is ready to be returned to the sender (e.g. after the recipient has received the shipper container 100 and opened the lid 20, which is communicated to the circuitry 240 via the Hall effects sensor as discussed above, indicating the goods (e.g., temperature sensitive medical goods) G have been received by the recipient), and automatically and simultaneously (with the switching of sender and recipient address information) wirelessly contact a shipping carrier (e.g., UPS, FedEx, DHL) to alert them that the shipper container 100 is ready for pickup (e.g., that a new shipping label has been "printed"). In one example, the automatic switching of sender and recipient address information and automatic contact of a shipping carrier automatically occurs when the lid 20 is opened (e.g., triggering a signal to the circuitry 240 via the metal rod MP). In another example, the automatic switching of sender and recipient address information automatically occurs when the lid 20 is opened (e.g., triggering a signal to the circuitry 240 via the metal rod MP), but the automatic contacting of the shipper carrier does not occur until a user actuates (e.g., touches, presses, depresses) the button 270. In another example, the switching of sender and recipient address information does not occur until a user actuates (e.g., touches, presses, depresses) the button 270, and immediately upon the actuation of the button 270 (if the lid 20 has been opened, the circuitry 240 automatically contacts the shipping carrier to alert them that the shipper container 100 is ready for pickup.

In one example, shown in FIG. 7B, the display screen 250 can optionally display packout instructions (e.g., one or more steps for packing the shipper container 100, a machine readable code, such a barcode or QR code). The user can read the steps on the display screen 250 and/or scan the machine readable code (e.g., with a code scanner, with the camera on their tablet computer or smartphone) to execute the steps for packing the shipper container 100 prior to shipping the shipper container 100 to the recipient. The display screen 250 can display the packout instructions, for example, upon pressing the button 270 multiple times to toggle to the various display screen types (e.g., shown in FIGS. 7A-7D).

In one example, shown in FIG. 7C, the display screen 250 can optionally display return instructions for the recipient (e.g., patient), such as listing one or more steps for the recipient to execute to return the shipper container 100, for example once the recipient has received the shipper container 100 and opened the lid 20 (triggering a signal to the circuitry 240 via the metal rod MP). In one example, the display screen 250 automatically displays the return instructions after the circuitry 240 (via the GPS sensor) indicates the shipper container 100 has reached the recipient address, and once the opening of the lid 20 is sensed (e.g. via the metal rod MP, as discussed above). In another example, the return instructions can be displayed on the display screen 250 upon pressing the button 270 multiple times to toggle to the various display screen types (e.g., shown in FIGS. 7A-7D).

In one example, shown in FIG. 7D, the display screen 250 can optionally display maintenance status, for example if there is a malfunction of the tablet 200 (e.g., sensed by one or more sensors that communicate with the circuitry 240). The maintenance status display can automatically be shown on the display screen 250 (e.g., with an error message and/or error code) when non-normal operation is detected for the tablet 200. Optionally, the maintenance status screen can optionally be removed from being displayed on the display screen 250 by actuating the button 270 (e.g., by a user touching, pressing, or depressing the button 270). In another example, the maintenance status screen cannot be cleared from the display screen 250 until the error with the tablet 200 is resolved.

With reference to FIG. 6, a charging unit 600 can have a body 610 with one or more (e.g., a plurality, such as 2, 3, 4, 5, 10) of slots 620, each slot sized to receive one tablet 200 therein. In one example, each of the one or more slots 620 can have electrical contacts that electrically contact corresponding electrical contacts of the tablet 200 that is inserted into the slot 620 to thereby electrically connect the tablet 200 to the charging unit 600, allowing the charging unit 600 to charge the one or more power storage devices 230 in the tablet 200 via the electrical contacts. The charging unit 600 can receive power from wall power via, for example, a power cord 630 attached to a plug (not shown). In another example, the charging unit 600 can have one or more (e.g., a plurality of) wireless power transmitters, such as inductive power transmitters (e.g., one inductive power transmitter associated with each of the slot(s) 620), allowing the charging unit 600 to charge the one or more power storage devices 230 in the tablet 200 via inductive coupling or wireless power transfer.

Having the tablet 200 being detachable from the container body 10 of the shipper container 100 provides various advantages. One advantage is that multiple tablet 200 can be charged simultaneously via the charging unit 600, shown in FIG. 6. This allows the tablet 200 on a shipper container 100 that has been used multiple times to ship goods (e.g., temperature sensitive medical goods) G and is running low on power to be readily swapped out and replaced with a tablet 200 that has one or more power storage devices 230 that are fully charged, allowing the shipper container 100 to be placed back into circulation almost immediately upon returning to the shipping location (e.g., sender address, warehouse), rather than having to take the shipper container 100 out of circulation to charge the tablet 200, which may take hours. Another advantage is that the same tablet 200 can be used with container bodies 10 of different sizes in different sized shipper containers 100, reducing the need to have a dedicated tablet 200 for each shipper container 100 (including larger sized shipper containers 100 that may not be used as often as smaller sized shipper containers 100). Therefore, a shipping company can have a certain number of shipper containers 100 of different sizes, but have less than the same number (e.g., ½ as many, ¾ as many) tablet 200, reducing the cost of the fleet of shipper containers 100.

Figure 10:
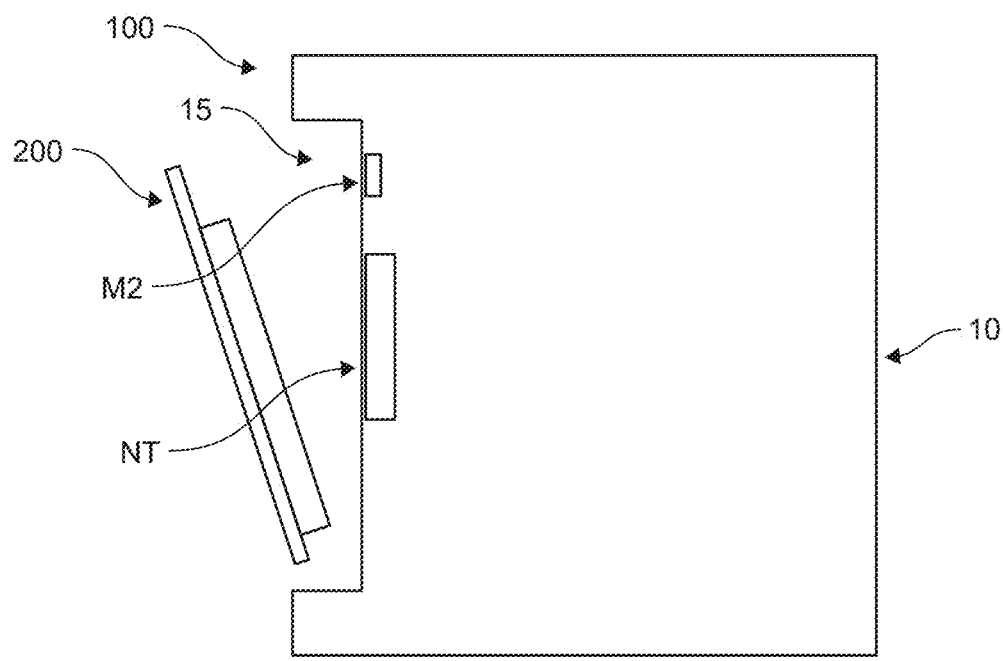
FIG. 10 shows a schematic view of pairing of a tablet with a container body for the portable shipping container.

FIG. 10 shows one example of how the tablet 200 can be paired with a container body 10 of a shipper container 100. In one example, a magnet M2 can optionally be attached to or embedded in the container body 10 (e.g., a wall of the container body 10, such as a wall of the recess 15). The container body 10 can also have a passive near field communication (NFC) tag NT with identification information for the container body 10. The tablet 200 (e.g., electronics in the tablet) can detect or read the NFC tag NT when the tablet is coupled to the container body 10, the tablet 200 (e.g., electronics in the tablet 200, circuitry 240 of the tablet 200) operable to read the NFC tag NT to pair the tablet 200 with the container body 10. In one example, when the tablet 200 is coupled to the container body 10 (e.g., in the manner discussed above with reference to FIGS. 5A-5E), the magnet M2 can trigger a Hall effect sensor in or on the tablet 200. The Hall effect sensor can communicate such a trigger signal to the circuitry 240, which can then cause electronics in the tablet 200 to read the NFC tag to acquire the identification information for the container body 10. In another example, the magnet M2 is excluded and electronics in the tablet 200 read the NFC tag and send a signal to the circuitry 240 indicating the tablet 200 is coupled to the container body 10. In another example, the tablet 200 has one or more sensors S (see FIG. 5D) that can detect when the tablet 200 is coupled to the container body 10 and send a signal to the circuitry 240, the tablet 200 (e.g., electronics in the tablet 200, circuitry of the tablet 200) operable to read the NFC tag NT to pair the tablet 200 with the container body 10 upon the circuitry 240 receiving the signal. The one or more sensors S can be or include an ambient light sensor, a proximity sensor, an infrared sensor, an ultraviolet sensor, or an accelerometer that detects specific movement associated with the coupling (e.g., latching) of the tablet 200 to the container body 10. In another example, to pair the container body 10 to the tablet 200, a machine readable code (e.g., bar code, QR code) on the container body 10 can be read (e.g., with a scanner, with a camera on a tablet computer or smartphone) and a machine readable code (e.g. bar code, QR code) on the tablet 200 (e.g., machine readable code displayed on display screen 250) can be read (e.g., with a scanner, with a camera on a tablet computer or smartphone). Once the tablet 200 is paired with the container body 10, the tablet 200 (e.g., the circuitry 240) can wirelessly communicate with the one or more sensor tags 300 in the payload chamber 18. In another example, the one or more sensor tags 300' can have a machine readable code (e.g., bar code, QR code) that can be scanned (e.g., with a scanner, with a camera on a tablet computer or smartphone), as shown in FIG. 11, to pair them with the tablet 200 to allow the sensor tags 300' to communicate (wirelessly) with the tablet 200 (e.g., with the circuitry 240).

The sensor tags 300, 300' can communicate wirelessly sensed temperature and/or sensed humidity information to the tablet 200 (e.g., to the circuitry 240, to the one or more memories). In one example, the sensed temperature and/or humidity data sensed by the sensor tags 300 and/or 300' is saved in the one or more memories of the tablet 200 throughout the transit of the shipper container 100 from the sender to the recipient. In one example, said data can also be wirelessly communicated by the tablet 200 to a cloud based data storage server and can be accessed therefrom (via a dashboard display) using an app via a tablet computer or smartphone or laptop computer or desktop computer. Said dashboard can be accessed by one or more users (e.g., shipper of goods, such as temperature sensitive medical goods, G, recipient, and/or sender) to track the temperature and/or humidity history of the payload chamber 18 and/or goods (e.g., temperature sensitive medical goods) G during transit of the shipper container 100 from the sender to the recipient. In another example, said data remains stored in the tablet 200 until the tablet 200 is detached from the container body 10 and coupled to the charging unit 600, which can also have a data transfer connection to download the saved data from the coupled tablet 200 and communicate it to a local or remote data storage server.

Figure 11:
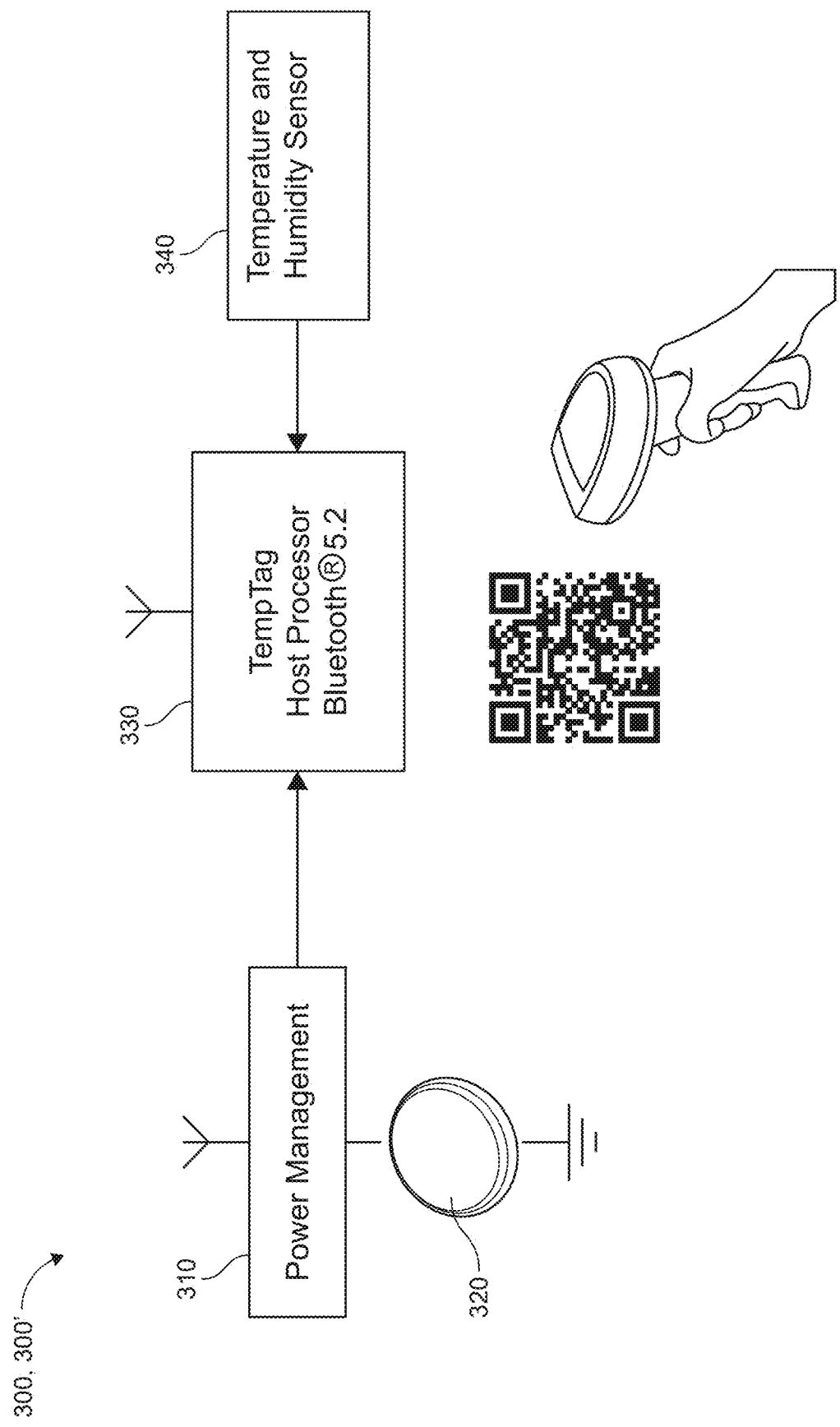
FIG. 11 shows a block diagram of a sensor tag.

FIG. 11 shows a system block diagram for the sensor tag 300, 300'. The sensor tag 300, 300' can have a power management module 310 (e.g. electronics or circuitry) that communicate with one or more power storage devices 320 (e.g., batteries such as Lithium ion batteries, capacitors such as super capacitors) of the sensor tag 300, 300'. The sensor tag 300, 300' can also have one or more processors 330 with one or more wireless antennas or modems that communicate with the power management module 310. In one example, the sensor tag 300, 300' has a near field communication (e.g., Bluetooth®) antenna. The sensor tag 300, 30' can also have one or more temperature and/or humidity sensors 340 that communicate with the one or more computer processors 330 and one or more wireless antennas or modems. The one or more power storage devices 320 provides power to the power management module 310, the one or more computer processors, one or more wireless antennas or modems, and/or to one or more temperature and/or humidity sensors 340. In one example, the sensor tag 300, 300' can also store-and-forward, for example via use of electrically erasable programmable read-only memory (EEPROM), flash memory or other storage medium, data in efforts to reduce power consumption. This data can be collected over a period of time (e.g., a configurable period of time) and batch transmitted to the tablet 200 at one or more (configurable) intervals to advantageously optimize power consumption.

Figure 12:
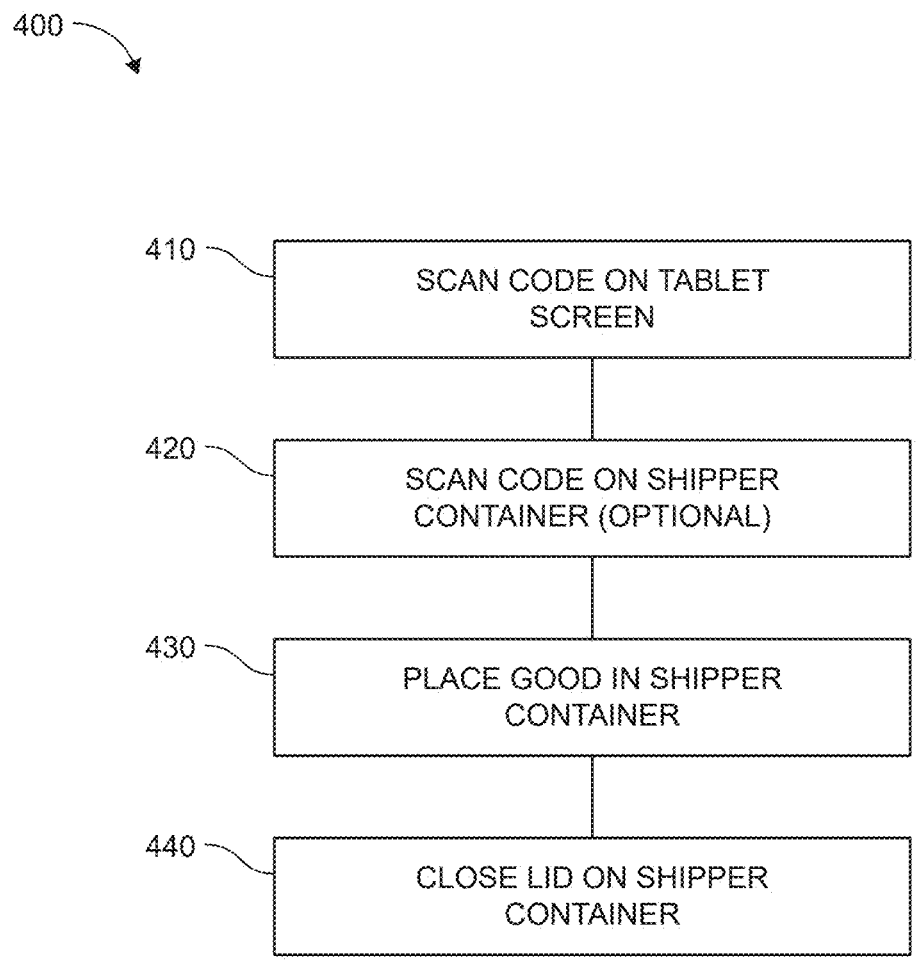
FIG. 12 shows a process for using a portable shipping container.

FIG. 12 shows a process 400 for using the shipper container 100 (e.g., to ship goods, such as temperature sensitive medical goods from a sender to a recipient). The process 400 includes the step 410 of scanning a code (e.g., machine readable code such as a barcode or QR code) on the display screen 250 of the tablet 200. The process 400 also includes an optional the step 420 of scanning a code (e.g., machine readable code such as a barcode or QR code) on the container body 10 of the shipper container 100. The process 400 also includes the step 430 of placing goods (e.g., temperature sensitive medical goods G) in the payload chamber 18 of the container body 10 of the shipper container 100. The process 400 also includes the step 440 of closing the lid 20 of the shipper container 100.

Figure 13:
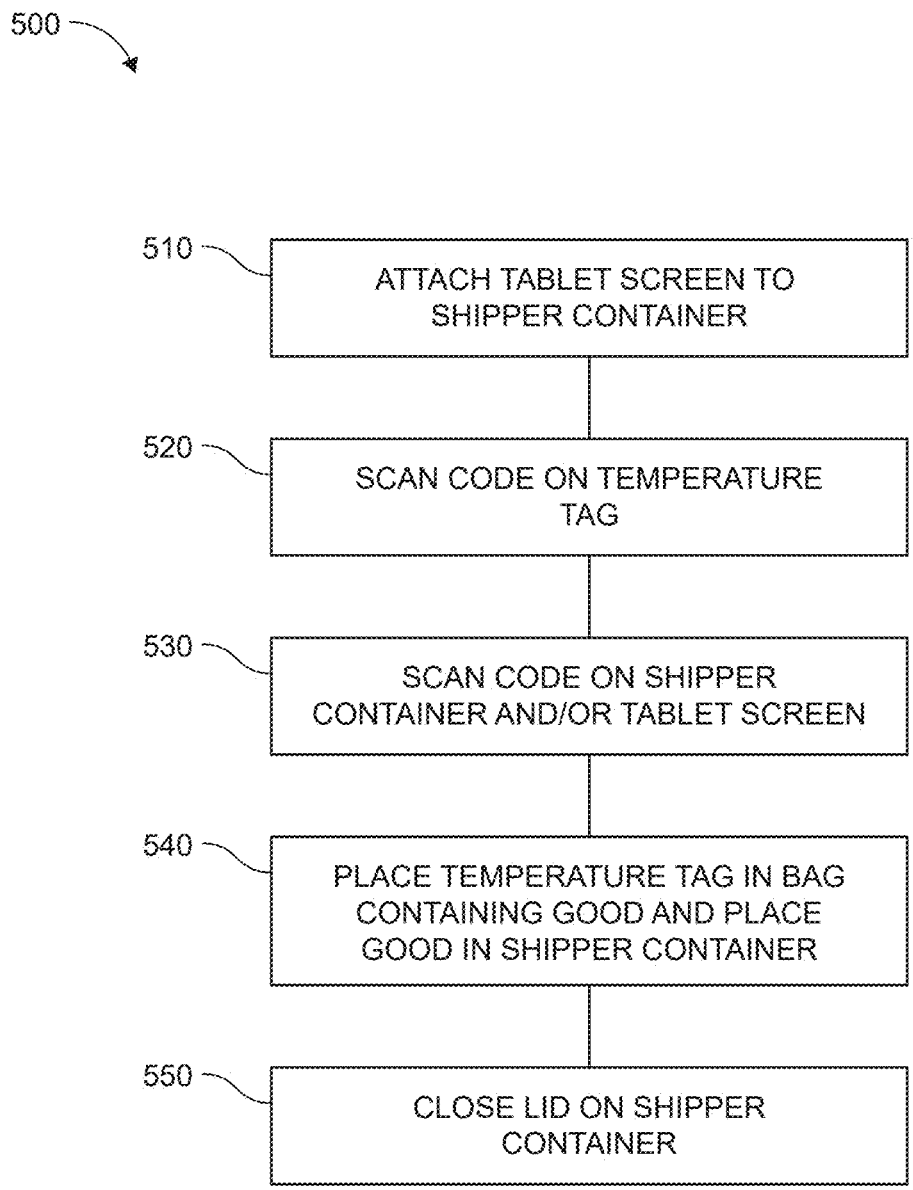
FIG. 13 shows a process for using a portable shipping container.

FIG. 13 shows a process 500 for using the shipper container 100 (e.g., to ship goods, such as temperature sensitive medical goods from a sender to a recipient). The process 500 includes the step 510 of attaching a tablet 200 to the container body 10 of a shipper container 100. The process 500 includes the step 520 of scanning a code (e.g., machine readable code such as a barcode or QR code) on a sensor tag 300, 300'. The process 500 also includes the step 530 of scanning a code (e.g., machine readable code, such as a barcode or QR code) on the container body 10 and/or display screen 250 of the tablet 200 (e.g., to pair the tablet 200 with the container body 10). The process 500 also includes the step 540 of placing goods (e.g., temperature sensitive medical goods G) in a package or bag P and place the package or bag P in the payload chamber 18 of the container body 10 of the shipper container 100. The process 500 also includes the step 550 of closing the lid 20 of the shipper container 100.

ADDITIONAL EMBODIMENTS

In embodiments of the present disclosure, a portable shipping container and method of operation may be in accordance with any of the following clauses:

Clause 1. A reusable portable shipper container, comprising: a container body having an insulated payload chamber configured to receive one or more goods; an insulated lid pivotally, sliding or removably coupled to the container body and actuatable to access the payload chamber; one or more sensors disposed in the payload chamber and operable to sense a parameter of the payload chamber or of the goods; and a tablet removably coupleable to the container body and comprising: an electronic display screen configured to display one or more of a) an electronic shipping label with sender address information, b) a packout instructions list screen, c) a return instructions list screen, and d) a maintenance status screen, one or more power storage devices, and circuitry configured to wirelessly communicate with the one or more sensors in the payload chamber and to store sensor data communicated by the one or more sensors in the payload chamber.

Clause 2. The reusable portable shipper container of Clause 1, wherein the payload chamber is vacuum insulated via a plurality of vacuum panels that define or surround the payload chamber.

Clause 3. The reusable portable shipper container of any preceding clause, wherein the tablet includes one or more sensors that include one or more GPS sensors configured to track a location of the container body when the tablet is coupled to the container body.

Clause 4. The reusable portable shipper container of any preceding clause, wherein the tablet comprises a non-transitory computer readable medium configured to store the sensed data communicated by the one or more sensors in the payload chamber, the sensed data comprising temperature or humidity data.

Clause 5. The reusable portable shipper container of any preceding clause, wherein the container body comprises a magnetic lock biased toward engagement with the tablet when the tablet is attached to the container body to retain the tablet attached to the container body, the magnetic lock embedded within the container body so it is not visible when the tablet is attached to the container body and the lid is in an open position, the magnetic lock configured to be movable to a retracted position by a magnetic tool when the lid is in the open position to allow the tablet to at least partially detach from the container body to facilitate decoupling and removal of the tablet from engagement with the container body.

Clause 6. The reusable portable shipper container of Clause 5, wherein the container body has one or more supports that releasably engage the tablet when the tablet is coupled to the container body, the one or more supports disposed on an opposite side of the container body from the magnetic lock, the one or more supports configured to inhibit the tablet from falling out of a recess of the container body when the magnetic lock is retracted.

Clause 7. The reusable portable shipper container of any preceding clause, wherein the tablet is flush with a surface of the container body when the tablet is coupled to the container body.

Clause 8. The reusable portable shipper container of any preceding clause, wherein the one or more sensors in the payload chamber includes one or more sensor tags removably attached to a surface of the payload chamber and operable to sense a humidity or temperature in the payload chamber and communicate one or more sensed payload conditions to the tablet.

Clause 9. The reusable portable shipper container of Clause 8, wherein the one or more sensors in the payload chamber includes one or more sensor tags disposed in a package or bag with the goods and operable to sense an environmental condition in the package or bag as a measure of a humidity or temperature, respectively of the goods, and configured to communicate the sensed humidity or temperature to the tablet.

Clause 10. The reusable portable shipper container of any preceding clause, further comprising a recessed latch assembly in the lid, the recessed latch assembly having a latch handle actuatable to open the lid relative to the container body.

Clause 11. The reusable portable shipper container of Clause 10, wherein the recessed latch assembly includes a bar spaced from the latch handle, the latch handle having a slot, the slot and bar configured to be coupled together by a band or zip tie extending through the slot and about the bar to inhibit inadvertent opening of the lid.

Clause 12. The reusable portable shipper container of any preceding clause, further comprising a metal rod embedded in the container body and extending to a proximal end of the container body opposite the lid when the lid is in a closed position, the lid comprising a magnet that aligns with an end of the metal rod when the lid is in the closed position, an opposite end of the metal rod extending to a location in the container body that is proximate the tablet display screen when the tablet display screen is coupled to the container body, wherein when the lid is in the closed position, the metal rod communicates a magnetic signal from the magnet in the lid toward the tablet display screen, a Hall effect sensors in or on the tablet configured to sense the magnetic signal and to communicate with the circuitry said signal as an indication that the lid is in the closed position, the circuitry configured to determine that the lid has been moved to an open position when the magnetic signal is not detected by the Hall effects sensor.

Clause 13. The reusable portable shipper container of any preceding clause, wherein the container body can be a plurality of container bodies of different sizes, the tablet being configured to removably couple each of the plurality of container bodies of different sizes.

Clause 14. The reusable portable shipper container of any preceding clause, wherein the container body has a near field communication (NFC) tag, the tablet configured to detect or read the NFC tag when the tablet couples to the container body, the tablet configured to read the NFC tag to pair the tablet with the container body.

Clause 15. The reusable portable shipper container of Clause 14, wherein the container body has a magnet embedded in the container body, a Hall effects sensor in or on the tablet configured to sense the magnet in the container body and to communicate a signal to the circuitry to indicate the tablet is coupled to the container body, the tablet configured to read the NFC tag to pair the tablet with the container body upon the circuitry receiving the signal.

Clause 16. The reusable portable shipper container of Clause 14, wherein detection of the NFC tag communicates a signal to the circuitry to indicate the tablet is coupled to the container body.

Clause 17. The reusable portable shipper container of Clause 14, wherein the tablet comprises a sensor configured to detect when the tablet is coupled to the container body and to communicate a signal to the circuitry to indicate the tablet is coupled to the container body, the tablet configured to read the NFC tag to pair the tablet with the container body upon the circuitry receiving the signal.

Clause 18. The reusable shipper container of Clause 17, wherein the sensor is an ambient light sensor, a proximity sensor, an infrared sensor or an accelerometer.

Clause 19. The reusable portable shipper container of any preceding clause, wherein the tablet comprises one or more buttons actuatable to operate a function of the tablet.

Clause 20. The reusable portable shipper container of any preceding clause, wherein the container body comprises a lock comprising an electronic solenoid configured to actuate a locking member into engagement with the tablet when the tablet is attached to the container body to retain the tablet attached to the container body, the lock configured to be movable to a retracted position by the electronic solenoid when the lid is in an open position to allow the tablet to at least partially detach from the container body to facilitate decoupling and removal of the tablet from engagement with the container body.

Clause 21. A reusable portable shipper container system, comprising: a plurality of reusable portable shippers, each having: a container body of different size with an insulated payload chamber configured to receive one or more goods, and one or more sensors disposed in the payload chamber and operable to sense one or both of a temperature and a humidity of the payload chamber or of the goods, and an insulated lid pivotally, sliding or removably coupled to the container body and actuatable to access the payload chamber; and a tablet removably coupleable to the container body of different size of each of the plurality of reusable portable shippers and comprising: an electronic display screen configured to display one or more of a) an electronic shipping label with sender address information and recipient address information, b) a packout instructions list screen, c) a return instructions list screen, and d) a maintenance status screen, one or more buttons actuatable to operate a function of the tablet display screen, one or more power storage devices, one or more sensors, and circuitry configured to wirelessly communicate with the one or more sensors in the payload chamber and to store sensed temperature and humidity data communicated by the one or more sensors in the payload chamber.

Clause 22. The reusable portable shipper container system of Clause 21, wherein the container body comprises a magnetic lock biased toward engagement with the tablet when the tablet is attached to the container body to retain the tablet attached to the container body, the magnetic lock embedded within the container body so it is not visible when the tablet is attached to the container body and the lid is in an open position, the magnetic lock configured to be movable to a retracted position by a magnetic tool when the lid is in the open position to allow the tablet to at least partially detach from the container body to facilitate decoupling and removal of the tablet from engagement with the container body.

Clause 23. The reusable portable shipper container system of Clause 22, wherein the container body has one or more supports that releasably engage the tablet when the tablet is coupled to the container body, the one or more supports disposed on an opposite side of the container body from the magnetic lock, the one or more supports configured to inhibit the tablet from falling out of a recess of the container body when the magnetic lock is retracted.

Clause 24. The reusable portable shipper container system of any of Clauses 21-23, wherein the tablet is flush with a surface of the container body when the tablet is coupled to the container body.

Clause 25. The reusable portable shipper container system of any of Clauses 21-24, wherein the one or more sensors in the payload chamber includes one or more sensor tags removably attached to a surface of the payload chamber and operable to sense a humidity or temperature in the payload chamber and communicate the sensed humidity or temperature to the tablet display screen.

Clause 26. The reusable portable shipper container system of Clause 25, wherein the one or more sensors in the payload chamber includes one or more sensor tags disposed in a package or bag with the goods and operable to sense a humidity or temperature in the package or bag as a measure of a humidity or temperature, respectively of the goods, and configured to communicate the sensed humidity or temperature to the tablet.

Clause 27. The reusable portable shipper container system of any of Clauses 21-26, wherein the container body further comprises a metal rod embedded in the container body and extending to a proximal end of the container body opposite the lid when the lid is in a closed position, the lid comprising a magnet that aligns with an end of the metal rod when the lid is in the closed position, an opposite end of the metal rod extending to a location in the container body that is proximate the tablet when the tablet is coupled to the container body, wherein when the lid is in the closed position, the metal rod communicates a magnetic signal from the magnet in the lid toward the tablet, a Hall effect sensors in or on the tablet configured to sense the magnetic signal and to communicate with the circuitry said signal as an indication that the lid is in the closed position, the circuitry configured to determine that the lid has been moved to an open position when the magnetic signal is not detected by the Hall effects sensor.

Clause 28. The reusable portable shipper container system of any of Clauses 21-27, wherein the container body has a magnet embedded in the container body and a near field communication (NFC) tag, the tablet configured to read the NFC tag when the tablet couples to the container body so that a Hall effects sensor in or on the tablet senses the magnet embedded in the container body, the tablet configured to read the NFC tag to pair the tablet with the container body.

Clause 29. A reusable portable shipper container, comprising: a container body having an insulated payload chamber configured to receive one or more goods; an insulated lid pivotally, sliding or removably coupled to the container body and actuatable to access the payload chamber; one or more sensors disposed in the payload chamber and operable to sense a parameter of the payload chamber or of the goods; and a tablet removably coupleable to the container body and comprising: a first side with a first printed label thereon, a second side with a second printed label thereon, the second side being opposite the first side, and circuitry configured to wirelessly communicate with the one or more sensors in the payload chamber and to store environmental data communicated by the one or more sensors in the payload chamber, wherein the tablet is configured to be coupled to the container body in a first orientation to display the first printed label with the second side facing the container body, and configured to be coupled to the container body in a second orientation to display the second printed label with the first side facing the container body.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel"

refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A reusable portable shipper container, comprising:
    a container body having an insulated payload chamber configured to receive one or more goods;
    a lid actuatable to selectively close or access the payload chamber;
    one or more sensors disposed in the payload chamber and operable to sense a parameter of the payload chamber or of the goods; and
    a tablet removably coupleable to the container body and comprising:
        an electronic display screen,
        one or more power storage devices, and
        circuitry configured to wirelessly communicate with the one or more sensors and to store sensor data communicated by the one or more sensors,
        wherein the container body comprises a lock configured to releasably engage the tablet when the tablet is attached to the container body to retain the tablet attached to the container body, the lock actuatable to disengage the tablet from the container body to facilitate detaching the tablet from the container body.

2. The reusable portable shipper container of claim 1, wherein the payload chamber is vacuum insulated via a plurality of vacuum panels that define or surround the payload chamber.

3. The reusable portable shipper container of claim 1, wherein the tablet includes one or more sensors that include one or more GPS sensors configured to track a location of the container body when the tablet is coupled to the container body.

4. The reusable portable shipper container of claim 1, wherein the circuitry comprises a non-transitory computer readable medium configured to store the sensed data communicated by the one or more sensors, the sensed data comprising temperature or humidity data.

5. The reusable portable shipper container of claim 1, wherein the container body has one or more supports that releasably engage the tablet when the tablet is coupled to the container body, the one or more supports configured to inhibit the tablet from falling out of a recess of the container body when the lock is actuated to disengage the tablet from the container body.

6. The reusable portable shipper container of claim 1, wherein the tablet is flush with a surface of the container body when the tablet is coupled to the container body and the lock is in an engaged position with the tablet.

7. The reusable portable shipper container of claim 1, wherein the one or more sensors in the payload chamber includes one or more sensor tags removably attached to a surface of the payload chamber and operable to sense a humidity or temperature in the payload chamber and to communicate one or more sensed payload conditions to the tablet.

8. The reusable portable shipper container of claim 7, wherein the one or more sensors in the payload chamber includes one or more sensor tags disposed in a package or bag with the goods and operable to sense an environmental condition in the package or bag as a measure of a humidity or temperature of the goods, and configured to communicate the sensed humidity or temperature to the tablet.

9. A reusable portable shipper container, comprising:
    a container body having an insulated payload chamber configured to receive one or more goods;
    a lid actuatable to selectively close or access the payload chamber;
    one or more sensors disposed in the payload chamber and operable to sense a parameter of the payload chamber or of the goods; and
    a tablet removably coupleable to the container body and comprising:
        an electronic display screen,
        one or more power storage devices, and
        circuitry configured to communicate with the one or more sensors,
        wherein the container body comprises a lock configured to releasably engage the tablet when the tablet is attached to the container body to retain the tablet attached to the container body, the lock actuatable to disengage the tablet to facilitate detaching the tablet from the container body.

10. The reusable portable shipper container of claim 9, wherein the payload chamber is vacuum insulated via a plurality of vacuum panels that define or surround the payload chamber.

11. The reusable portable shipper container of claim 9, wherein the tablet includes one or more sensors that include one or more GPS sensors configured to track a location of the container body when the tablet is coupled to the container body.

12. The reusable portable shipper container of claim 9, wherein the container body has one or more supports that releasably engage the tablet when the tablet is coupled to the container body, the one or more supports disposed on an opposite side of the container body from the lid, the one or more supports configured to inhibit the tablet from falling out of a recess of the container body when the lock is actuated to disengage the tablet from the container body.

13. The reusable portable shipper container of claim 9, wherein the tablet is flush with a surface of the container body when the tablet is coupled to the container body and the lock is in an engaged position with the tablet.

14. The reusable portable shipper container of claim 9, wherein the one or more sensors in the payload chamber includes one or more sensor tags removably attached to a surface of the payload chamber and operable to sense a humidity or temperature in the payload chamber and communicate one or more sensed payload conditions to the tablet.

15. The reusable portable shipper container of claim 14, wherein the one or more sensors in the payload chamber includes one or more sensor tags disposed in a package or bag with the goods and operable to sense an environmental condition in the package or bag as a measure of a humidity or temperature of the goods, and configured to communicate the sensed humidity or temperature to the tablet.

16. A reusable portable shipper container, comprising:
   a container body having an insulated payload chamber configured to receive one or more goods;
   a lid actuatable to selectively close or access the payload chamber;
   one or more sensors disposed in the payload chamber and operable to sense a parameter of the payload chamber or of the goods; and
   a tablet removably coupleable to the container body and comprising:
      an electronic display screen,
      one or more power storage devices, and
      circuitry configured to communicate with the one or more sensors,
   wherein the container body comprises a lock configured to releasably engage the tablet when the tablet is attached to the container body to retain the tablet attached to the container body, the lock actuatable to disengage the tablet to facilitate removal of the tablet from engagement with the container body.

17. The reusable portable shipper container of claim 16, wherein the tablet includes one or more sensors that include one or more GPS sensors configured to track a location of the container body when the tablet is coupled to the container body.

18. The reusable portable shipper container of claim 16, wherein the container body has one or more supports that releasably engage the tablet when the tablet is coupled to the container body, the one or more supports configured to inhibit the tablet from falling out of a recess of the container body when the lock is actuated to disengage the tablet from the container body.

19. The reusable portable shipper container of claim 16, wherein the one or more sensors in the payload chamber includes one or more sensor tags removably attached to a surface of the payload chamber and operable to sense a humidity or temperature in the payload chamber and to communicate one or more sensed payload conditions to the tablet.

20. The reusable portable shipper container of claim 16, wherein the container body has a near field communication (NFC) tag, the tablet configured to detect or read the NFC tag when the tablet couples to the container body to pair the tablet with the container body.

* * * * *